US008699542B2

(12) United States Patent
Mori et al.

(10) Patent No.: US 8,699,542 B2
(45) Date of Patent: Apr. 15, 2014

(54) INFORMATION LEAKAGE PREVENTION APPARATUS AND METHOD

(75) Inventors: Toshinori Mori, Tokyo (JP); Ryo Ishikawa, Tokyo (JP); Hitoshi Nobata, Tokyo (JP); Yasunao Suzuki, Tokyo (JP)

(73) Assignees: NTT Advanced Technology Corporation, Tokyo (JP); Nippon Telegraph and Telephone Corporation, Tokyo (JP)

( * ) Notice: Subject to any disclaimer, the term of this patent is extended or adjusted under 35 U.S.C. 154(b) by 104 days.

(21) Appl. No.: 13/393,537

(22) PCT Filed: Jul. 16, 2010

(86) PCT No.: PCT/JP2010/062062

§ 371 (c)(1), (2), (4) Date: Feb. 29, 2012

(87) PCT Pub. No.: WO2011/027623

PCT Pub. Date: Mar. 10, 2011

(65) Prior Publication Data

US 2012/0163417 A1 Jun. 28, 2012

(30) Foreign Application Priority Data

Sep. 4, 2009 (JP) ................................ 2009-204519

(51) Int. Cl.
*H04B 1/713* (2011.01)

(52) U.S. Cl.
USPC ........... 375/135; 713/189; 713/190; 713/191; 380/252

(58) Field of Classification Search
USPC ........................... 375/135; 713/189, 190, 191
See application file for complete search history.

(56) References Cited

U.S. PATENT DOCUMENTS 6,240,123 B1 * 5/2001 Zhang et al. .................. 375/130
7,889,866 B2 * 2/2011 Masugi et al. ................ 380/252

(Continued)

FOREIGN PATENT DOCUMENTS

JP H09-098152 A 4/1997
JP 2005-323198 11/2005

(Continued)

OTHER PUBLICATIONS

Yamada et al., "Estimation of the EMI Reduction by Spread Spectrum Clock", IEICE Technical Report, Dec. 14, 2001, vol. 101, No. 530, pp. 37-42.

(Continued)

*Primary Examiner* — Daniel Washburn
*Assistant Examiner* — Berhanu Tadese
(74) *Attorney, Agent, or Firm* — Blakely Sokoloff Taylor & Zafman

(57) ABSTRACT

A spread spectrum modulation unit (12) performs spread spectrum clocking processing for a basic clock signal (BC) synchronized with the carrier frequency or its harmonic frequency of image information leaked from an unwanted electromagnetic wave. A modulation pattern generation unit (13) generates and outputs, as a modulation pattern signal (MP), a PN code having sign bit data synchronized with each pulse of the obtained spread spectrum clock signal SC. In addition, the modulation pattern generation unit (13) resets the repetition period of the PN code based on a horizontal sync signal (H). A modulated clock generation unit (14) modulates the spread spectrum clock signal (SC) in accordance with the modulation pattern signal (MP). The obtained modulated clock signal (MC) is amplified, generating a leakage prevention signal (JC). A leakage prevention signal containing a sideband component of a satisfactory level can be generated, obtaining a useful leakage prevention effect.

14 Claims, 22 Drawing Sheets

(56) References Cited

U.S. PATENT DOCUMENTS

| | | | | |
|---|---|---|---|---|
| 2002/0136535 | A1* | 9/2002 | Ogino et al. | 386/94 |
| 2007/0019601 | A1* | 1/2007 | Kim et al. | 370/342 |
| 2009/0013205 | A1* | 1/2009 | Masugi et al. | 713/500 |
| 2009/0041380 | A1* | 2/2009 | Watanabe et al. | 382/276 |
| 2009/0154765 | A1* | 6/2009 | Watanabe et al. | 382/100 |
| 2010/0169980 | A1* | 7/2010 | Kim et al. | 726/27 |
| 2012/0163417 | A1* | 6/2012 | Mori et al. | 375/135 |

FOREIGN PATENT DOCUMENTS

| | | | | | |
|---|---|---|---|---|---|
| JP | 2007-026184 | | | 2/2007 | |
| JP | 2007-208705 | | | 8/2007 | |
| JP | 2008-283520 | A | | 11/2008 | |
| WO | WO/02/78188 | | * | 3/2002 | H03L 7/023 |
| WO | WO 02078188 | A1 | * | 10/2002 | |
| WO | WO 2005/114902 | | | 12/2005 | |

OTHER PUBLICATIONS

"XAPP469—Spread-Spectrum Clocking Reception for Displays", http://japan.xilinx.com/support/documentation/application_notes/j_xapp469.pdf, support documentation, Spartan-3A DSP FPGA Application Note, XAPP469 (v1.0), Aug. 22, 2008, Xilinx.

Suzki, Yasunao et al., "Countermeasure Technique Against Information Leakage Due to Electromagnetic Wave Radiated from PCs", NTT GIJUTU Journal ON LINE, Japan, vol. 20, No. 8, pp. 11-15, Aug. 2008, URL: http://www.ntt.co.jp/journal/0808/files/jn20080801l.pdf.

Suzuki, Yasuno et al. "A Study on Countermeasure Technique for Information Leakage Caused by Emanations from a PC", Proceedings of the 2009 IEICE General Conference, the Institute of Electronics, Information and Communication Engineering, p. 386, Mar. 4, 2009.

* cited by examiner

INFORMATION LEAKAGE PREVENTION APPARATUS AND METHOD

This is a non-provisional application claiming the benefit of International Application Number PCT/JP2010/062062 filed Jul. 16, 2010.

TECHNICAL FIELD

The present invention relates to an information leakage prevention technique and, more particularly, to a technique of preventing leakage of image information from an unwanted electromagnetic wave containing the signal component of an image signal generated by an information processing apparatus.

BACKGROUND ART

The signal component of an image signal generated by an information processing apparatus is sometimes contained in an unwanted electromagnetic wave unintentionally radiated from an information processing apparatus such as a computer, an external screen display device connected to the information processing apparatus, or a cable such as a signal cable or power cable connected to the information processing apparatus or screen display device. The unwanted electromagnetic wave is eavesdropped to reproduce original image information, illicitly acquiring various kinds of information contained in the image information.

As an information leakage prevention technique of preventing leakage of image information from an unwanted electromagnetic wave, there has been proposed an information leakage prevention apparatus which prevents reproduction of image information contained in an unwanted electromagnetic wave by generating a leakage prevention signal synchronized with an image signal from an information processing apparatus and superposing it on the unwanted electromagnetic wave (see, for example, patent literature 1).

FIG. 23 is a block diagram showing the arrangement of a conventional information leakage prevention apparatus. In an information leakage prevention apparatus 50, a basic clock generation unit 51 generates a basic clock signal BC having the dot clock frequency or its harmonic frequency of each dot data forming image information, based on a horizontal sync signal H or vertical sync signal V from an information processing apparatus 20. A modulation pattern generation unit 52 generates a fixed modulation pattern signal MP having each sign bit data synchronized with a pulse obtained by frequency-dividing the basic clock signal BC. A modulated clock generation unit 53 generates a modulated clock signal MC by modulating the basic clock signal BC in accordance with the modulation pattern signal MP.

FIG. 24 is a timing chart showing a clock modulation operation in the conventional information leakage prevention apparatus. In the modulation pattern generation unit 52, the repetition period of the modulation pattern signal MP is reset based on the horizontal sync signal H. Thus, predetermined pattern modulation is repetitively performed in the period of the horizontal sync signal H based on the basic clock signal BC.

An output amplification unit 54 amplifies the modulated clock signal MC generated by the modulated clock generation unit 53, generating a leakage prevention signal JC. The leakage prevention signal JC is output to the ground potential of the image signal of the information processing apparatus 20 or simultaneously to both the ground potential and image signal. Alternatively, the leakage prevention signal JC is transmitted from an antenna. As a result, the leakage prevention signal JC is superposed on an unwanted electromagnetic wave.

FIG. 25 exemplifies an image reproduced from an unwanted electromagnetic wave. FIG. 25 is merely a schematic view and does not faithfully express the reproduced image. In this example, a vertical stripe mask pattern (black part) corresponding to sign bit data of the modulation pattern signal MP is composited on original image information. The mask pattern degrades the visibility of the original image information reproduced from the unwanted electromagnetic wave, preventing information leakage.

PRIOR ART LITERATURES

Patent Literatures

Patent Literature 1: Japanese Patent Laid-Open No. 2008-283520

Non-Patent Literatures

Non-Patent Literature 1: "XAPP469—Spread-Spectrum Clocking Reception for Displays", http://japan.xilinx.com/support/documentation/application_notes/j_xapp469.pdf, support documentation, Spartan-3A DSP FPGA Application Note, XAPP469 (v1.0), Aug. 22, 2008, Xilinx

SUMMARY OF THE INVENTION

Problem to be Solved by the Invention

However, the conventional technique places importance on generation of a mask pattern shape capable of further degrading visibility as a mask pattern to be composited on original image information contained in an unwanted electromagnetic wave. No leakage prevention signal is superposed on the entire sideband of the carrier frequency of the unwanted electromagnetic wave, so no useful leakage prevention effect may be obtained.

Leaked image information from an information processing apparatus is radiated in synchronism with a dot clock frequency $f_0$ or its harmonic frequency ($f_0 \times N$: N is an integer of 2 or more) at the display image resolution out of an unwanted electromagnetic wave. However, the image information is neither the dot clock frequency $f_0$ serving as the carrier of the unwanted electromagnetic wave nor its harmonic frequency ($f_0 \times N$), and is contained in the sideband of the carrier. This is because the modulation pattern for modulating the basic clock signal intrinsically has a frequency band of a predetermined width.

FIG. 26 shows the frequency spectrum of an unwanted electromagnetic wave in the conventional information leakage prevention apparatus. FIG. 26 shows a frequency spectrum using a carrier of a 0.39-GHz ($f_0 \times 6$) harmonic wave which is six times (N=6) higher than the dot clock frequency $f_0$=65 MHz (XGA) in an example using a leakage prevention signal obtained by modulating the basic clock signal in accordance with a fixed pattern.

In FIG. 26, when attention is paid to the sideband of the carrier, the sideband component level of the unwanted electromagnetic wave upon superposing the leakage prevention signal has high peaks at several frequencies. However, the whole sideband component level is almost the same as that when the information processing apparatus operates alone, that is, when no leakage prevention signal is superposed. This means that the sideband component level of the unwanted electromagnetic wave does not change even if the leakage prevention signal is superposed on the unwanted electromagnetic wave.

Hence, a leakage prevention signal of a satisfactory level is not superposed on the sideband component of the leakage prevention signal obtained by the conventional technique. In some cases, original image information may be reproduced from the sideband of an unwanted electromagnetic wave.

According to the conventional technique, the sideband component level is low, so the output level of the carrier frequency of the leakage prevention signal needs to be raised to obtain the leakage prevention effect. However, at such high output level, the radiation field strength at the carrier frequency may exceed the regulatory level of VCCI (Voluntary Control Council for Information Technology Equipment) or the like.

The present invention has been made to solve the above-described problems, and has as its object to provide an information leakage prevention technique capable of generating a leakage prevention signal containing a sideband component of a satisfactory level with respect to the entire sideband of the carrier frequency of an unwanted electromagnetic wave, and obtaining a useful leakage prevention effect.

Means of Solution to the Problem

To achieve the above object, according to the present invention, there is provided an information leakage prevention apparatus which generates, based on an image signal generated by an information processing apparatus, a leakage prevention signal for preventing leakage of image information from an unwanted electromagnetic wave containing a signal component of the image signal, comprising a basic clock generation unit that generates a basic clock signal that has a carrier frequency of the image information leaked from the unwanted electromagnetic wave or a harmonic frequency of the carrier frequency and synchronizes with a horizontal sync signal or vertical sync signal contained in the image signal, a spread spectrum modulation unit that generates a spread spectrum clock signal by performing spread spectrum clocking processing for the basic clock signal, a modulation pattern generation unit that outputs, as a modulation pattern signal, a PN (Pseudo Noise) code having sign bit data synchronized with each pulse of the spread spectrum clock signal, and resets a repetition period of the PN code based on the horizontal sync signal, a modulated clock generation unit that generates a modulated clock signal by modulating the spread spectrum clock signal in accordance with the modulation pattern signal, and an output amplification unit that amplifies the modulated clock signal to generate the leakage prevention signal.

According to the present invention, there is provided an information leakage prevention method of generating, based on an image signal externally output from an information processing apparatus, a leakage prevention signal for preventing leakage of image information from an unwanted electromagnetic wave containing a signal component of the image signal, comprising the basic clock generation step of generating a basic clock signal that has a carrier frequency of the image information leaked from the unwanted electromagnetic wave or a harmonic frequency of the carrier frequency and synchronizes with a horizontal sync signal or vertical sync signal contained in the image signal, the spread spectrum modulation step of generating a spread spectrum clock signal by performing spread spectrum clocking processing for the basic clock signal, the modulation pattern generation step of outputting, as a modulation pattern signal, a PN (Pseudo Noise) code having sign bit data synchronized with each pulse of the spread spectrum clock signal, and resetting a repetition period of the PN code based on the horizontal sync signal, the modulated clock generation step of generating a modulated clock signal by modulating the spread spectrum clock signal in accordance with the modulation pattern signal, and the output amplification step of amplifying the modulated clock signal to generate the leakage prevention signal.

According to the present invention, there is provided another information leakage prevention apparatus which generates, based on an image signal generated by an information processing apparatus, a leakage prevention signal for preventing leakage of image information from an unwanted electromagnetic wave containing a signal component of the image signal, comprising a basic clock generation unit that generates a basic clock signal that has a carrier frequency of the image information leaked from the unwanted electromagnetic wave or a harmonic frequency of the carrier frequency and synchronizes with a horizontal sync signal or vertical sync signal contained in the image signal, a spread spectrum modulation unit that generates a spread spectrum clock signal by performing spread spectrum clocking processing for the basic clock signal, and an output amplification unit that amplifies the spread spectrum clock signal to generate the leakage prevention signal.

According to the present invention, there is provided still another information leakage prevention apparatus which generates, based on an image signal generated by an information processing apparatus, a leakage prevention signal for preventing leakage of image information from an unwanted electromagnetic wave containing a signal component of the image signal, comprising a basic clock generation unit that generates a basic clock signal that has a carrier frequency of the image information leaked from the unwanted electromagnetic wave or a harmonic frequency of the carrier frequency and synchronizes with a horizontal sync signal or vertical sync signal contained in the image signal, a modulation pattern generation unit that outputs, as a modulation pattern signal, a PN (Pseudo Noise) code having sign bit data synchronized with each pulse of the basic clock signal, and resets a repetition period of the PN code based on the horizontal sync signal, a modulated clock generation unit that generates a modulated clock signal by modulating the basic clock signal in accordance with the modulation pattern signal, and an output amplification unit that amplifies the modulated clock signal to generate the leakage prevention signal.

According to the present invention, there is provided another information leakage prevention method comprising the basic clock generation step of generating a basic clock signal that has a carrier frequency of image information leaked from an unwanted electromagnetic wave or a harmonic frequency of the carrier frequency and synchronizes with a horizontal sync signal or vertical sync signal contained in an image signal, the spread spectrum modulation step of generating a spread spectrum clock signal by performing spread spectrum clocking processing for the basic clock signal, and the output amplification step of amplifying the spread spectrum clock signal to generate a leakage prevention signal.

According to the present invention, there is provided still another information leakage prevention method of generating, based on an image signal generated by an information processing apparatus, a leakage prevention signal for preventing leakage of image information from an unwanted electromagnetic wave containing a signal component of the image signal, comprising the basic clock generation step of generating a basic clock signal that has a carrier frequency of the image information leaked from the unwanted electromagnetic wave or a harmonic frequency of the carrier frequency and synchronizes with a horizontal sync signal or vertical sync signal contained in the image signal, the modulation pattern generation step of outputting, as a modulation pattern signal, a PN (Pseudo Noise) code having sign bit data synchronized with each pulse of the basic clock signal, and resetting a repetition period of the PN code based on the horizontal sync signal, the modulated clock generation step of generating a modulated clock signal by modulating the basic clock signal in accordance with the modulation pattern signal, and the output amplification step of amplifying the modulated clock signal to generate the leakage prevention signal.

Effects of the Invention

The present invention can generate a leakage prevention signal containing a sideband component of a satisfactory level in the entire sideband of the carrier frequency of an unwanted electromagnetic wave, compared to the case in which the information processing apparatus operates alone and the case in which the conventional fixed pattern modulation method is used. This can make it very difficult to reproduce original image information using the sideband component of the unwanted electromagnetic wave, obtaining a useful leakage prevention effect.

In addition, the radiation field strength at the carrier frequency of an unwanted electromagnetic wave can be easily reduced to the regulatory level of VCCI or the like.

BEST MODE FOR CARRYING OUT THE INVENTION

Embodiments of the present invention will now be described with reference to the accompanying drawings.

First Embodiment

Figure 1:
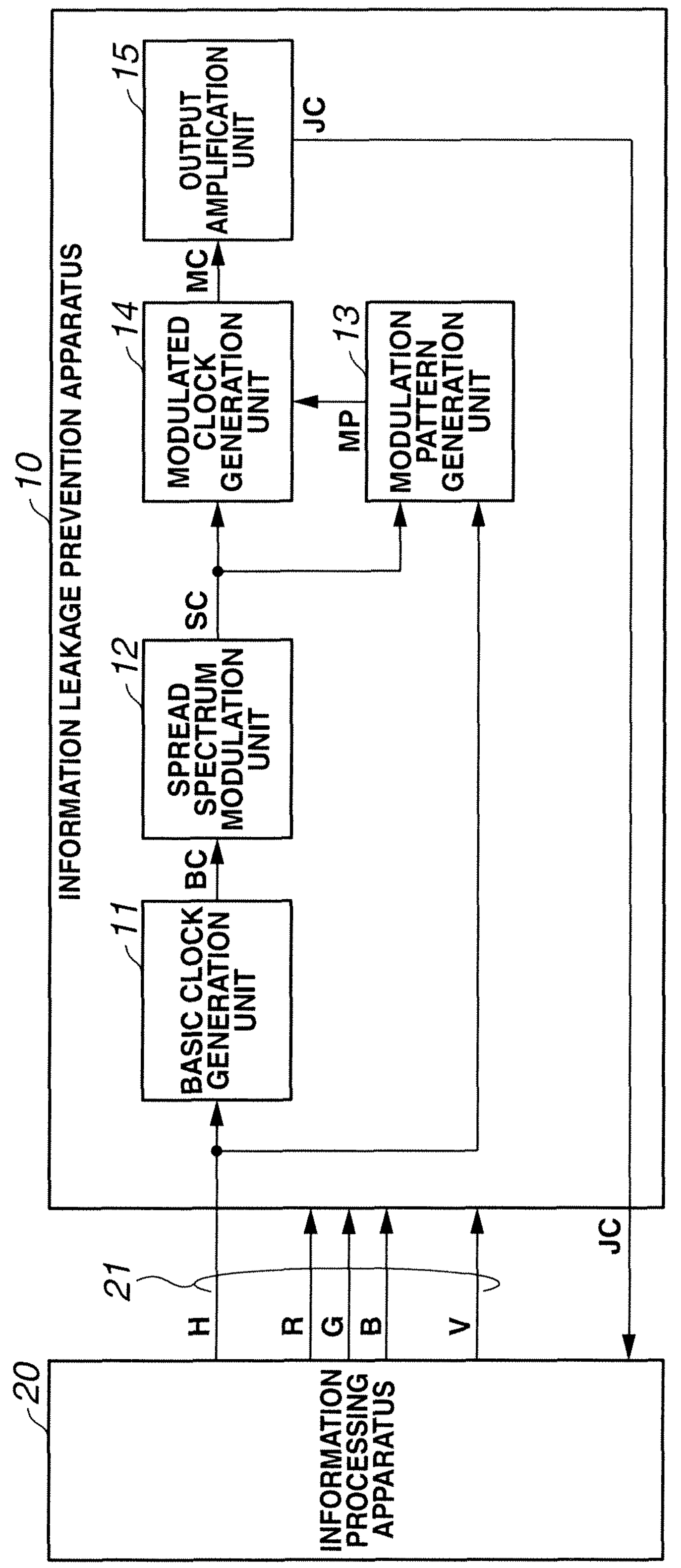
FIG. 1 is a block diagram showing the arrangement of an information leakage prevention apparatus according to the first embodiment.

An information leakage prevention apparatus according to the first embodiment of the present invention will be described with reference to FIG. 1. FIG. 1 is a block diagram showing the arrangement of the information leakage prevention apparatus according to the first embodiment.

An overall information leakage prevention apparatus 10 is formed from a signal processing circuit apparatus. The information leakage prevention apparatus 10 has a function of generating, based on an image signal 21 generated by an information processing apparatus 20 such as a computer, a leakage prevention signal JC for preventing leakage of image information from an unwanted electromagnetic wave radiated from the information processing apparatus 20, an external screen display device (not shown) connected to the information processing apparatus 20, or a cable such as a signal cable or power cable connected to the information processing apparatus or screen display device.

In the embodiment, spread spectrum clocking processing is performed for the basic clock signal BC having the carrier frequency or its harmonic frequency of image information leaked from an unwanted electromagnetic wave. A PN (Pseudo Noise) code having sign bit data synchronized with each pulse of the obtained spread spectrum clock signal SC is generated and output as the modulation pattern signal MP. In addition, the repetition period of the PN code is reset based on the horizontal sync signal H. The spread spectrum clock signal SC is modulated in accordance with the modulation pattern signal MP, and the obtained modulated clock signal MC is amplified, generating the leakage prevention signal JC.

The arrangement of the information leakage prevention apparatus according to the embodiment will be explained in detail with reference to FIG. 1. The information leakage prevention apparatus 10 according to the embodiment includes, as main functional units, a basic clock generation unit 11, spread spectrum modulation unit 12, modulation pattern generation unit 13, modulated clock generation unit 14, and output amplification unit 15.

The basic clock generation unit 11 is formed from a general clock generation circuit such as a PLL circuit or multiplication circuit. The basic clock generation unit 11 has a function of generating the basic clock signal BC which has the carrier frequency or its harmonic frequency of image information leaked from an unwanted electromagnetic wave and synchronizes with the horizontal sync signal H or vertical sync signal V contained in the image signal 21.

The frequency of the basic clock signal BC suffices to have the carrier frequency or its harmonic frequency of image information leaked from an unwanted electromagnetic wave from the information processing apparatus 20, an external screen display device connected to the information processing apparatus 20, or a cable such as a signal cable or power cable connected to the information processing apparatus 20 or screen display device. The following two types of frequencies are proposed as the frequency of the basic clock signal BC.

The spread spectrum modulation unit 12 is formed from a general spread spectrum modulation circuit, and has a function of generating the spread spectrum clock signal SC by performing spread spectrum clocking processing for the basic clock signal BC. Spread spectrum clocking processing used in the spread spectrum modulation unit 12 is a spread method based on a known technique (see non-patent literature 1 and the like). This spread method changes the output clock frequency gradually with a predetermined frequency width.

More specifically, this spread method includes a center-spread method, down-spread method, and up-spread method. The center-spread method periodically changes the output clock frequency $f_{OUT}$ with a frequency width of about several % up and down using the input clock frequency $f_{IN}$ as the center. The down-spread method periodically changes the output clock frequency $f_{OUT}$ with a frequency width of about several % only downward using the input clock frequency $f_{IN}$ as the center. The up-spread method periodically changes the output clock frequency $f_{OUT}$ with a frequency width of about several % only upward using the input clock frequency $f_{IN}$ as the center.

The modulation pattern generation unit 13 has a function of outputting, as the modulation pattern signal MP, a PN code having sign bit data synchronized with each pulse of the spread spectrum clock signal SC, and a function of resetting the repetition period of the PN code based on the horizontal sync signal H of the image signal 21. The modulation pattern generation unit 13 generates the modulation pattern signal MP formed from the PN code having the period of the horizontal sync signal H as the repetition period.

The modulated clock generation unit 14 has a function of generating the modulated clock signal MC by modulating the spread spectrum clock signal SC in accordance with the modulation pattern signal MP. The modulated clock generation unit 14 generates the modulated clock signal MC by modulating each bit of the spread spectrum clock signal SC by logical calculation such as exclusive OR with a corresponding bit of the modulation pattern signal MP.

The output amplification unit 15 is formed from a general amplification circuit, and has a function of generating the leakage prevention signal JC by amplifying the modulated clock signal MC. The leakage prevention signal JC is output to the ground potential of the image signal of the information processing apparatus 20 or simultaneously to both the ground potential and image signal. Alternatively, the leakage prevention signal JC is transmitted from an antenna. Then, the leakage prevention signal JC is superposed on an unwanted electromagnetic wave.

[Frequency of Basic Clock Signal]

As described above, two types of frequencies are proposed as the frequency of the basic clock signal BC generated by the basic clock generation unit 11.

The first method uses the dot clock frequency or its harmonic frequency of the image signal 21 externally output from the information processing apparatus 20 to an external screen display device (not shown) connected to the information processing apparatus 20.

The second method uses a frequency set in advance in the information leakage prevention apparatus 10 that is the carrier frequency or its harmonic frequency of image information leaked from an unwanted electromagnetic wave radiated from the information processing apparatus 20, an external screen display device connected to the information processing apparatus 20, or a cable such as a signal cable or power cable connected to the information processing apparatus or screen display device.

An image signal generated by the general information processing apparatus 20 uses the dot clock frequency based on a standard specification or resolution. In most cases, the image signal 21 complying with the standard specification or resolution is output especially to the external screen display device connected to the information processing apparatus 20 to ensure matching with the screen display device and versatility.

When image information leaked from an unwanted electromagnetic wave uses an image signal having the dot clock frequency based on the standard specification or resolution, the carrier frequency of the image information leaked from the unwanted electromagnetic wave can be specified in advance from the dot clock frequency or its harmonic frequency of the image signal based on the standard specification or resolution of the image signal 21.

From this, based on the first method, the basic clock generation unit 11 generates the basic clock signal BC having, as the clock frequency, the dot clock frequency or its harmonic frequency of the image signal 21 externally output from the information processing apparatus to the externally connected screen display device.

For example, the basic clock generation unit 11 may extract a clock signal having the dot clock frequency $f_0$ or its harmonic frequency based on a luminance signal (RGB) representing dot data contained in the image signal 21, and generate the basic clock signal BC based on the clock signal.

To the contrary, in the information processing apparatus 20 incorporating a screen display device, such as a notebook PC, the screen display device in the apparatus may use a frequency different from the dot clock frequency which complies with the standard specification or resolution and is used by the image signal 21 externally output from the information processing apparatus 20 for an externally connected screen display device. Also, the external screen display device connected to the information processing apparatus 20 may use, for screen display within the device, a frequency different from the dot clock frequency which complies with the standard specification or resolution and is used by the image signal 21 externally output from the information processing apparatus 20.

In this case, when the basic clock signal BC is generated using the dot clock frequency which complies with the standard specification or resolution and is used by the image signal 21, or the harmonic frequency of the dot clock frequency, the carrier frequency or its harmonic frequency of image information leaked from an unwanted electromagnetic wave differs from the carrier frequency of the leakage prevention signal JC, i.e., the clock frequency of the basic clock signal BC. The generated leakage prevention signal JC may not have a useful leakage prevention effect.

To obtain a satisfactory leakage prevention effect, the basic clock generation unit 11 generates, based on the second method, the basic clock signal BC having the carrier frequency or its harmonic frequency of image information leaked from an unwanted electromagnetic wave from the information processing apparatus 20, an external screen display device connected to the information processing apparatus 20, or a cable such as a signal cable or power cable connected to the information processing apparatus 20 or screen display device.

For example, when the carrier frequency or its harmonic frequency of image information leaked from an unwanted electromagnetic wave is known, firmware for generating this frequency is set in advance in the information leakage prevention apparatus 10.

Alternatively, a desired frequency may be set from the outside of the information leakage prevention apparatus 10 based on the measurement result of the carrier frequency or its harmonic frequency of image information leaked from an unwanted electromagnetic wave.

More specifically, a plurality of firmware programs having different clock frequencies are set in advance in the information leakage prevention apparatus 10, and a firmware program having a desired clock frequency is selected by an operation from the outside of the information leakage prevention apparatus 10. Alternatively, a firmware program having an arbitrary clock frequency is registered in the information processing apparatus 20 from the outside via the data input/output interface of the information leakage prevention apparatus 10.

[Operation in First Embodiment]

Figure 2:
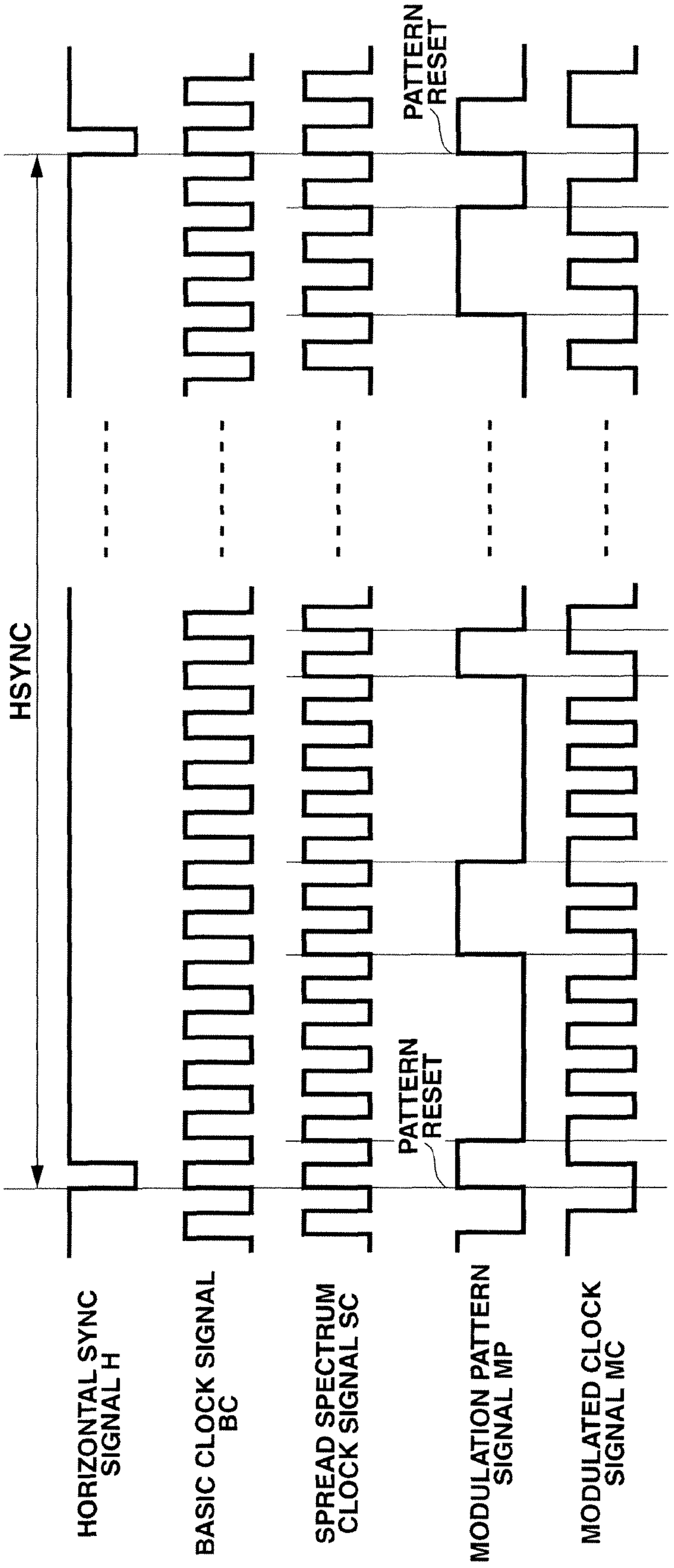
FIG. 2 is a timing chart showing the operation of the information leakage prevention apparatus according to the first embodiment.

The operation of the information leakage prevention apparatus according to the embodiment will be explained with reference to FIG. 2. FIG. 2 is a timing chart showing the operation of the information leakage prevention apparatus according to the first embodiment. A case in which a frequency used as the basic clock signal is determined based on the above-described first method will be exemplified. However, this can also apply to the second method described above.

For example, for XGA (resolution: 1024×768), the information processing apparatus 20 outputs a sync pulse having a 48-kHz HSYNC period as the horizontal sync signal H. The basic clock generation unit 11 generates the basic clock signal BC having the dot clock frequency $f_0$ or its harmonic frequency of each dot data forming the image signal 21 generated by the information processing apparatus 20. The basic clock generation unit 11 outputs the basic clock signal BC at a timing synchronized with the horizontal sync signal H or vertical sync signal V contained in the image signal 21.

The spread spectrum modulation unit 12 performs spread spectrum clocking processing for the basic clock signal BC input from the basic clock generation unit 11. Accordingly, the spread spectrum modulation unit 12 generates the spread spectrum clock signal SC having a clock frequency which periodically changes with a frequency width of, e.g., about several % on the up and down sides centered on the dot clock frequency $f_0$ or its harmonic frequency.

The modulation pattern generation unit 13 generates a PN code having sign bit data synchronized with each pulse of the spread spectrum clock signal SC input from the spread spectrum modulation unit 12. At this time, the modulation pattern generation unit 13 resets the repetition period of the PN code based on the horizontal sync signal H of the image signal 21. As a result, the modulation pattern generation unit 13 generates the modulation pattern signal MP formed from the PN code having the period of the horizontal sync signal H as the repetition period.

The modulated clock generation unit 14 modulates the spread spectrum clock signal SC input from the spread spectrum modulation unit 12 in accordance with the modulation pattern signal MP input from the modulation pattern generation unit 13. Hence, the modulated clock generation unit 14 generates the modulated clock signal MC by modulating each pulse of the spread spectrum clock signal SC by each bit of the modulation pattern signal MP.

The output amplification unit 15 amplifies the modulated clock signal MC input from the modulated clock generation unit 14, generating the leakage prevention signal JC. The leakage prevention signal LTC is output to the ground potential of the image signal of the information processing apparatus 20 or simultaneously to both the ground potential and image signal. Alternatively, the leakage prevention signal LTC is transmitted from the antenna. Then, the leakage prevention signal JC is superposed on an unwanted electromagnetic wave.

Figure 3:
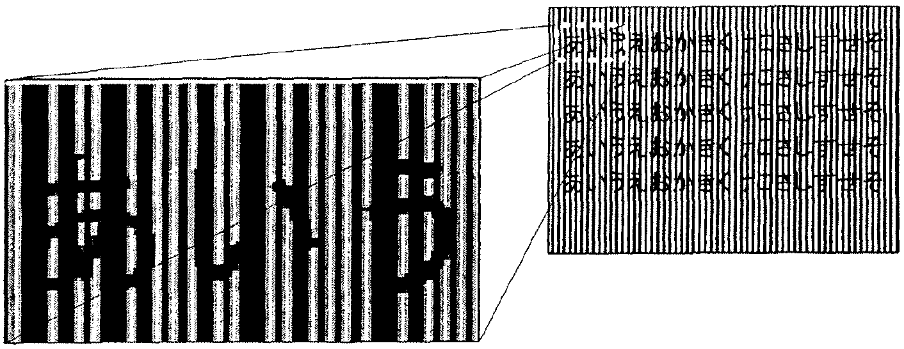
FIG. 3 is a view exemplifying an image reproduced from a leakage prevention signal-superposed unwanted electromagnetic wave according to the first embodiment.

FIG. 3 exemplifies an image reproduced from a leakage prevention signal-superposed unwanted electromagnetic wave according to the first embodiment. Note that FIG. 3 is merely a schematic view, and does not faithfully express the reproduced image. In this example, a random vertical stripe mask pattern formed by the PN code having the period of the horizontal sync signal H as the repetition period is composited on original image information. The leakage prevention signal JC is generated using the spread spectrum clock signal SC obtained by performing spread spectrum clocking processing for the basic clock signal BC.

Thus, the entire mask pattern-composited image is displayed in a blur in the horizontal direction (right-and-left direction of the screen).

Figure 4:
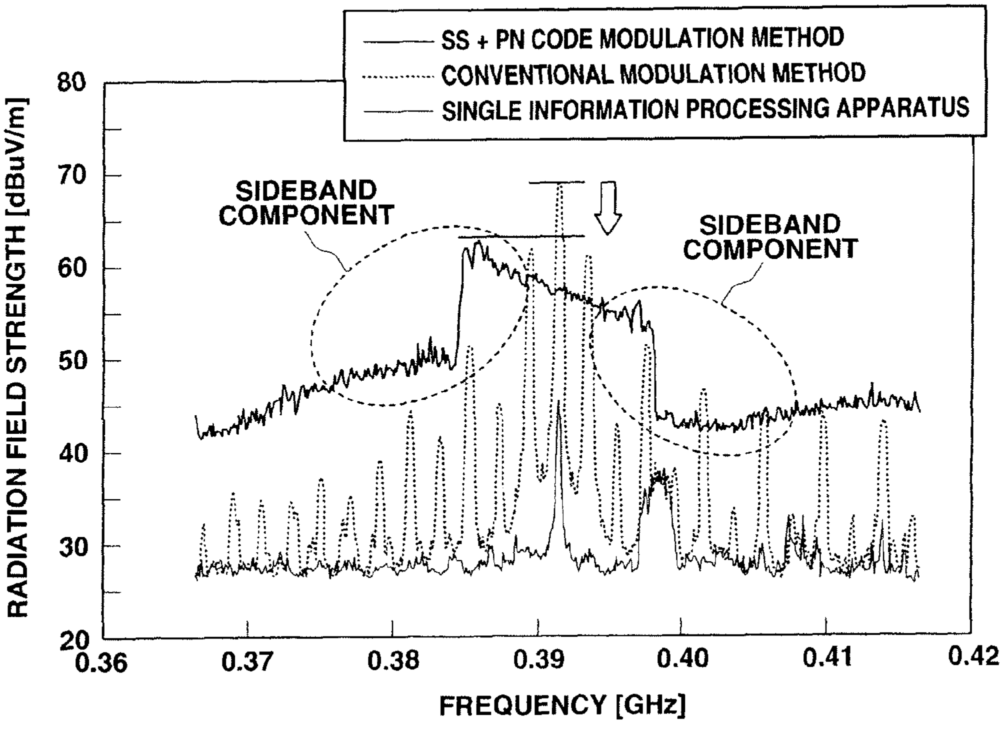
FIG. 4 is a graph showing the frequency spectrum of an unwanted electromagnetic wave in the use of the information leakage prevention apparatus according to the first embodiment.

FIG. 4 shows the frequency spectrum of an unwanted electromagnetic wave in the use of the information leakage prevention apparatus according to the first embodiment. Similar to the above-mentioned example, FIG. 4 shows a frequency spectrum using a carrier of a 0.39-GHz ($f_0 \times 6$) harmonic component which is six times (N=6) higher than the dot clock frequency component $f_0$=65 MHz (XGA) in an example using a leakage prevention signal obtained by modulating the basic clock signal in accordance with a fixed pattern.

FIG. 4 reveals that the sideband component level of an unwanted electromagnetic wave greatly rises in the entire sideband of the carrier frequency of the unwanted electromagnetic wave, compared to the case in which the information processing apparatus operates alone and the case in which the conventional fixed pattern modulation method is used. This means that the leakage prevention signal obtained according to the embodiment contains a sideband component of a satisfactory level. This can make it very difficult to reproduce original image information using the sideband component of the unwanted electromagnetic wave. Further, the spread effect of spread spectrum clocking processing reduces the radiation field strength at the carrier frequency of the unwanted electromagnetic wave.

[Effects of First Embodiment]

As described above, in the embodiment, the spread spectrum modulation unit 12 generates the spread spectrum clock signal SC by performing spread spectrum clocking processing for the basic clock signal BC synchronized with the carrier frequency of image information leaked from an unwanted electromagnetic wave from the information processing apparatus 20, an external screen display device connected to the information processing apparatus 20, or a cable such as a signal cable or power cable connected to the information processing apparatus 20 or screen display device. The modulation pattern generation unit 13 generates a PN code having sign bit data synchronized with each pulse of the spread spectrum clock signal SC, and outputs the PN code as the modulation pattern signal MP. In addition, the modulation pattern generation unit 13 resets the repetition period of the PN code based on the horizontal sync signal H of the image signal 21. The modulated clock generation unit 14 generates the modulated clock signal MC by modulating the spread spectrum clock signal SC in accordance with the modulation pattern signal MP. The modulated clock signal MC is amplified, generating the leakage prevention signal JC.

A leakage prevention signal containing a sideband component of a satisfactory level can be generated in the entire sideband of the carrier frequency of an unwanted electromagnetic wave, compared to the case in which the information processing apparatus operates alone and the case in which the conventional fixed pattern modulation method is used. This can make it very difficult to reproduce original image information using the sideband component of the unwanted electromagnetic wave, obtaining a useful leakage prevention effect.

Also, the radiation field strength at the carrier frequency of an unwanted electromagnetic wave can be easily reduced to the regulatory level of VCCI (Voluntary Control Council for Information Technology Equipment) or the like.

In the embodiment, the basic clock generation unit 11 may use, as the frequency of the basic clock signal BC based on the aforementioned first method, the dot clock frequency or its harmonic frequency of the image signal 21 externally output from the information processing apparatus 20 to an external screen display device connected to the information processing apparatus 20.

When the internal screen display device of the information processing apparatus 20 or an external screen display device connected to the information processing apparatus 20 displays image information using the dot clock frequency of the image signal 21, leakage of image information from an unwanted electromagnetic wave radiated from the screen display device or a cable such as a signal cable or power cable connected to the screen display device can be prevented very effectively.

In the embodiment, the basic clock generation unit 11 may use, as the frequency of the basic clock signal BC based on the second method described above, a frequency set in advance in the information leakage prevention apparatus 10 that is the carrier frequency or its harmonic frequency of image information leaked from an unwanted electromagnetic wave.

In this case, even when the internal screen display device of the information processing apparatus 20 or an external screen display device connected to the information processing apparatus 20 displays image information using a dot clock frequency different from the dot clock frequency of the image signal 21, leakage of image information from an unwanted electromagnetic wave can be prevented very effectively.

In the embodiment, the initial value and stage count of the PN code used to generate the modulation pattern signal MP by the modulation pattern generation unit 13 may be set from the outside of the information leakage prevention apparatus 10. More specifically, a plurality of firmware programs having different initial values and stage counts of the PN code are set in advance in the information leakage prevention apparatus 10, and a firmware program having a desired initial value and stage count is selected by an operation from the outside of the information leakage prevention apparatus 10. Alternatively, a firmware program having an arbitrary initial value and stage count is registered in the information leakage prevention apparatus 10 from the outside via the data input/output interface of the information leakage prevention apparatus 10.

The initial value and stage count of the PN code can be easily changed to easily generate the leakage prevention signal JC corresponding to the radiation characteristic of an unwanted electromagnetic wave. One information leakage prevention apparatus 10 can widely cope with unwanted electromagnetic waves of different radiation characteristics.

Second Embodiment

Figure 5:
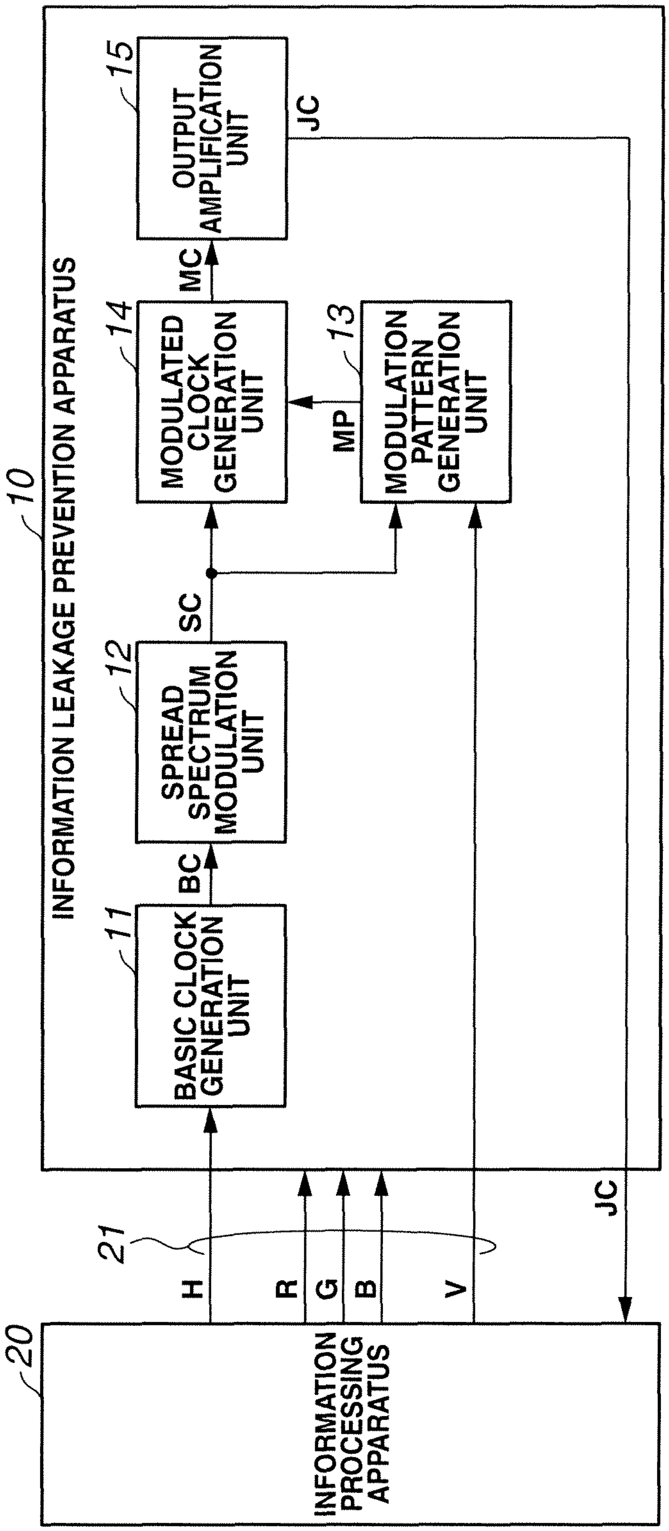
FIG. 5 is a block diagram showing the arrangement of an information leakage prevention apparatus according to the second embodiment.

An information leakage prevention apparatus according to the second embodiment of the present invention will be explained with reference to FIG. 5. FIG. 5 is a block diagram showing the arrangement of the information leakage prevention apparatus according to the second embodiment.

The second embodiment is different from the first embodiment in that a modulation pattern generation unit 13 resets the repetition period of the PN code based on not the horizontal sync signal H but vertical sync signal V of an image signal 21.

The remaining arrangement is the same as that in the first embodiment, and a detailed description thereof will not be repeated.

Figure 6:
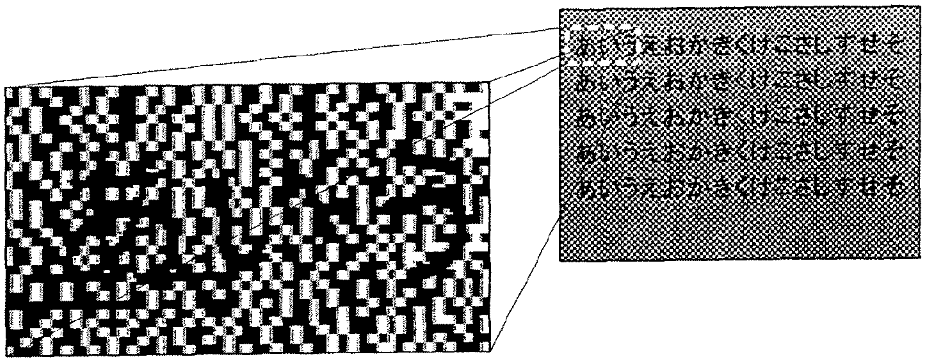
FIG. 6 is a view exemplifying an image reproduced from a leakage prevention signal-superposed unwanted electromagnetic wave according to the second embodiment.

FIG. 6 exemplifies an image reproduced from a leakage prevention signal-superposed unwanted electromagnetic wave according to the second embodiment. Note that FIG. 6 is merely a schematic view, and does not faithfully express the reproduced image. In this example, a random mottled mask pattern formed by the PN code having the period of the vertical sync signal V as the repetition period is composited on original image information. The leakage prevention signal JC is generated using a spread spectrum clock signal obtained by performing spread spectrum clocking processing for the basic clock signal BC. Therefore, the mask pattern-composited image itself is displayed in a blur in the horizontal direction (right-and-left direction of the screen).

Figure 7:
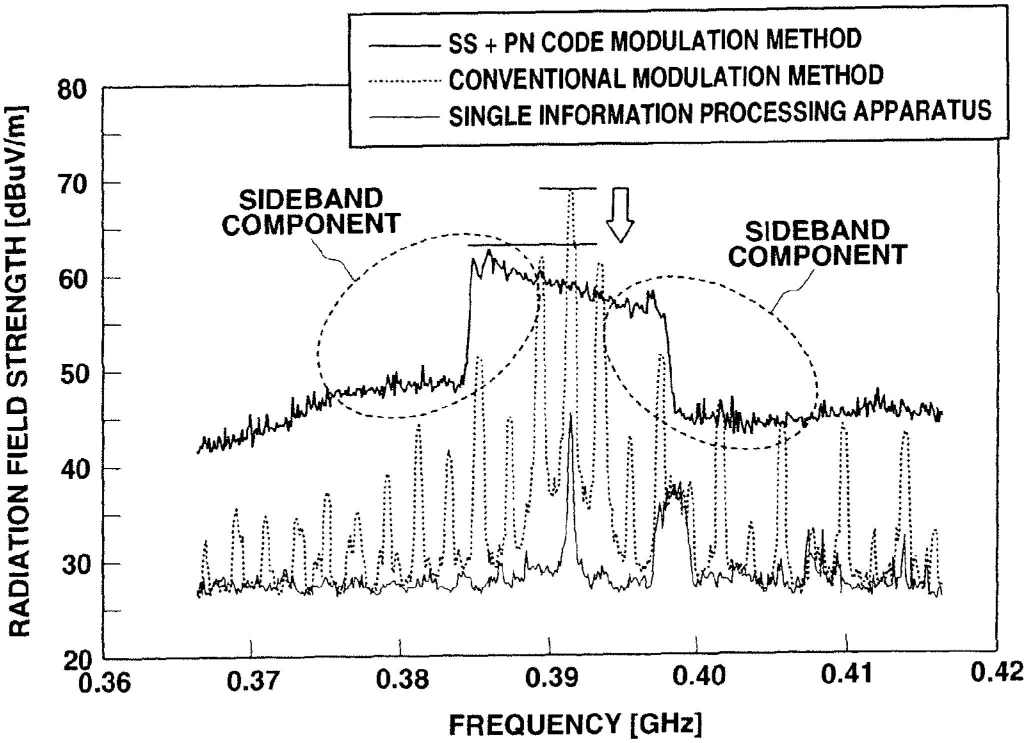
FIG. 7 is a graph showing the frequency spectrum of an unwanted electromagnetic wave in the use of the information leakage prevention apparatus according to the second embodiment.

FIG. 7 shows the frequency spectrum of an unwanted electromagnetic wave in the use of the information leakage prevention apparatus according to the second embodiment. Similar to the above-mentioned example, FIG. 7 shows a frequency spectrum using a carrier of a 0.39-GHz ($f_0\times6$) harmonic component which is six times (N=6) higher than the dot clock frequency component $f_0$=65 MHz (XGA) in an example using a leakage prevention signal obtained by modulating the basic clock signal in accordance with a fixed pattern.

FIG. 7 reveals that the sideband component level of an unwanted electromagnetic wave greatly rises in the entire sideband of the carrier frequency of the unwanted electromagnetic wave, compared to the case in which the information processing apparatus operates alone and the case in which the conventional fixed pattern modulation method is used. This means that the leakage prevention signal obtained according to the embodiment contains a sideband component of a satisfactory level. This can make it very difficult to reproduce original image information using the sideband component of the unwanted electromagnetic wave. In addition, the spread effect of spread spectrum clocking processing reduces the radiation field strength at the carrier frequency of the unwanted electromagnetic wave.

[Effects of Second Embodiment]

In some cases, an information processing apparatus such as a notebook PC incorporating a screen display device such as an LCD adopts, as the horizontal sync frequency of an image signal used in the internal screen display device, a unique frequency different from a standard horizontal sync frequency used in an image signal externally output from the information processing apparatus. In this example, when a leakage prevention signal is generated based on the horizontal sync frequency of the externally output image signal, no satisfactory leakage prevention effect may be obtained because the leakage prevention signal does not synchronize with an original image signal contained in an unwanted electromagnetic wave.

According to the embodiment, a leakage prevention signal is generated based on the vertical sync signal of an image signal externally output from the information processing apparatus. Even if internal and external image signals have different horizontal sync frequencies, the leakage prevention signal can be synchronized with an original image signal contained in an unwanted electromagnetic wave. This is because most information processing apparatuses adopt a standard frequency for the vertical sync signal. Therefore, a sufficient leakage prevention effect can be obtained even for an information processing apparatus in which internal and external image signals have different horizontal sync frequencies.

According to the embodiment, the sideband component level of an unwanted electromagnetic wave greatly rises, compared to the case in which the information processing apparatus operates alone and the case in which the conventional fixed pattern modulation method is used. Also, the sideband component level of an unwanted electromagnetic wave rises, compared to even the case in which the repetition period of the PN code is reset in accordance with the horizontal sync signal, similar to the first embodiment.

This is because the repetition period of the PN code is reset not in the horizontal sync period HSYNC but in the longer vertical sync period VSYNC and a more significant spread effect is obtained. This can make it very difficult to reproduce original image information using the sideband component of an unwanted electromagnetic wave.

Similar to the first embodiment, the radiation field strength at the carrier frequency of an unwanted electromagnetic wave can be easily reduced to the regulatory level of VCCI or the like.

Third Embodiment

Figure 8:
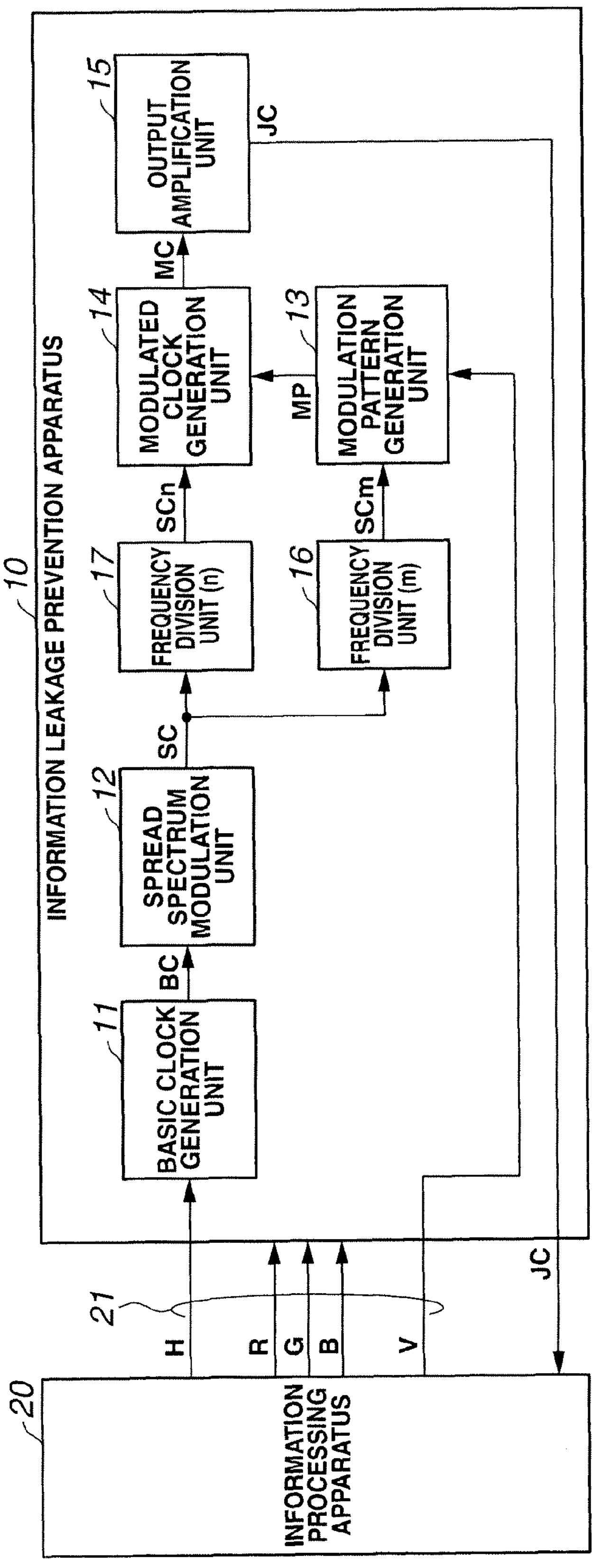
FIG. 8 is a block diagram showing the arrangement of an information leakage prevention apparatus according to the third embodiment.

An information leakage prevention apparatus according to the third embodiment of the present invention will be explained with reference to FIG. 8. FIG. 8 is a block diagram showing the arrangement of the information leakage prevention apparatus according to the third embodiment.

The third embodiment is different from the second embodiment in that a frequency division unit 16 is interposed between a spread spectrum modulation unit 12 and a modulation pattern generation unit 13, and a frequency division unit 17 is interposed between the spread spectrum modulation unit 12 and a modulated clock generation unit 14. The remaining arrangement is the same as that in the first embodiment, and a detailed description thereof will not be repeated.

The frequency division unit 16 is formed from a general clock frequency division circuit, and has a function of frequency-dividing the spread spectrum clock signal SC input from the spread spectrum modulation unit 12 by m (m is a positive integer) to generate a spread spectrum clock signal SCm and output it to the modulation pattern generation unit 13.

The frequency division unit 17 is formed from a general clock frequency division circuit, and has a function of frequency-dividing the spread spectrum clock signal SC input from the spread spectrum modulation unit 12 by n (n is a positive integer) to generate a spread spectrum clock signal SCn and output it to the modulated clock generation unit 14.

[Operation in Third Embodiment]

Figure 9:
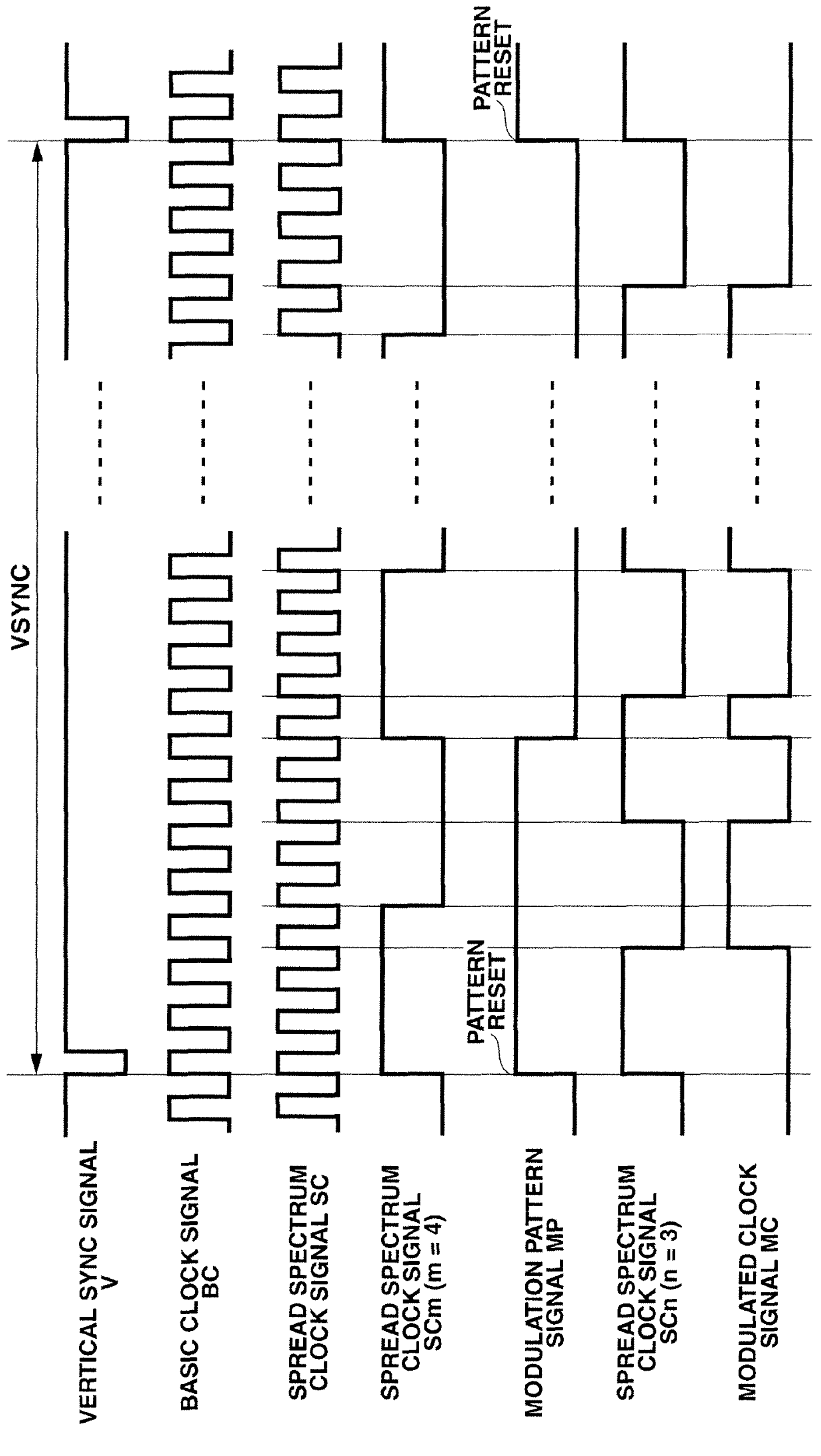
FIG. 9 is a timing chart showing the operation of the information leakage prevention apparatus according to the third embodiment.

The operation of the information leakage prevention apparatus according to the embodiment will be explained with reference to FIG. 9. FIG. 9 is a timing chart showing the operation of the information leakage prevention apparatus according to the third embodiment.

The frequency division unit 16 generates the spread spectrum clock signal SCm by frequency-dividing the spread spectrum clock signal SC input from the spread spectrum modulation unit 12 by m, in this example, by 4 (m=4).

The modulation pattern generation unit 13 generates a PN code at the bit rate of the spread spectrum clock signal SCm input from the frequency division unit 16. At this time, the modulation pattern generation unit 13 resets the repetition period of the PN code based on the vertical sync signal V of an image signal 21. Accordingly, the modulation pattern generation unit 13 generates the modulation pattern signal MP formed from the PN code having the period of the vertical sync signal V as the repetition period.

In contrast, the frequency division unit 17 generates the spread spectrum clock signal SCn by frequency-dividing the spread spectrum clock signal SC input from the spread spectrum modulation unit 12 by n, in this example, by 3 (n=3).

The modulated clock generation unit 14 modulates the spread spectrum clock signal SCn input from the frequency division unit 17 in accordance with the modulation pattern signal MP input from the modulation pattern generation unit 13. As a result, the modulated clock generation unit 14 generates the modulated clock signal MC by modulating each bit of the spread spectrum clock signal SC by each bit of the modulation pattern signal MP having the bit rate of the spread spectrum clock signal SCm.

[Effects of Third Embodiment]

An information processing apparatus such as a notebook PC incorporating a screen display device such as an LCD sometimes employs, as the dot clock frequency $f_0$ contained in an image signal used in the internal screen display device, a unique frequency different from a standard dot clock frequency $f_s$ used in an image signal externally output from the information processing apparatus. In this example, no satisfactory leakage prevention effect may be obtained because the leakage prevention signal does not synchronize with an original image signal contained in an unwanted electromagnetic wave radiated from the information processing apparatus or a cable such as a signal cable or power cable connected to the information processing apparatus. This also applies to a case in which an external screen display device connected to the information processing apparatus uses, for screen display within the device, a frequency different from the dot clock frequency which complies with the standard specification or resolution and is used by an image signal externally output from the information processing apparatus.

Figure 10:
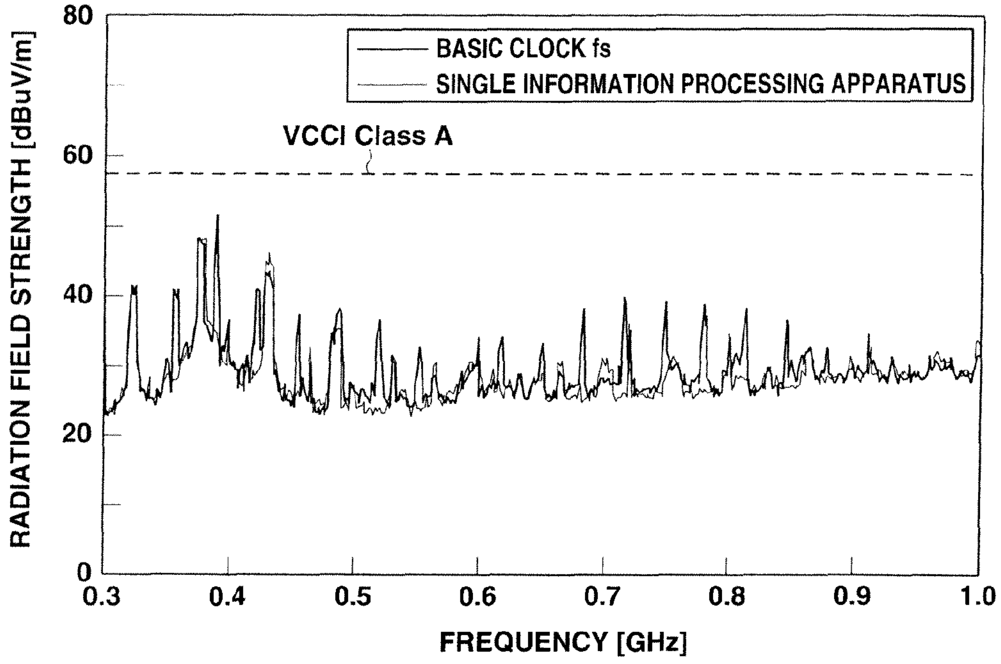
FIG. 10 is a graph showing the frequency spectrum of an unwanted electromagnetic wave based on the difference in dot clock frequency.

FIG. 10 shows the frequency spectrum of an unwanted electromagnetic wave based on the difference in dot clock frequency. In this case, the level difference is small between a frequency spectrum when the information processing apparatus operates alone and that when a leakage prevention signal having the dot clock frequency $f_s$ is used. This is because the dot clock frequency $f_0$ contained in the image signal used in the internal screen display device differs from the frequency $f_s$ of the basic clock signal used to generate the leakage prevention signal. For this reason, no sufficient leakage prevention effect may be obtained.

According to the embodiment, the modulated clock signal MC can be generated using spread spectrum clock signals obtained by frequency-dividing the spread spectrum clock signal SC at arbitrary frequency division ratios m and n. The leakage prevention signal JC can be spread to a wider frequency band.

Figure 11:
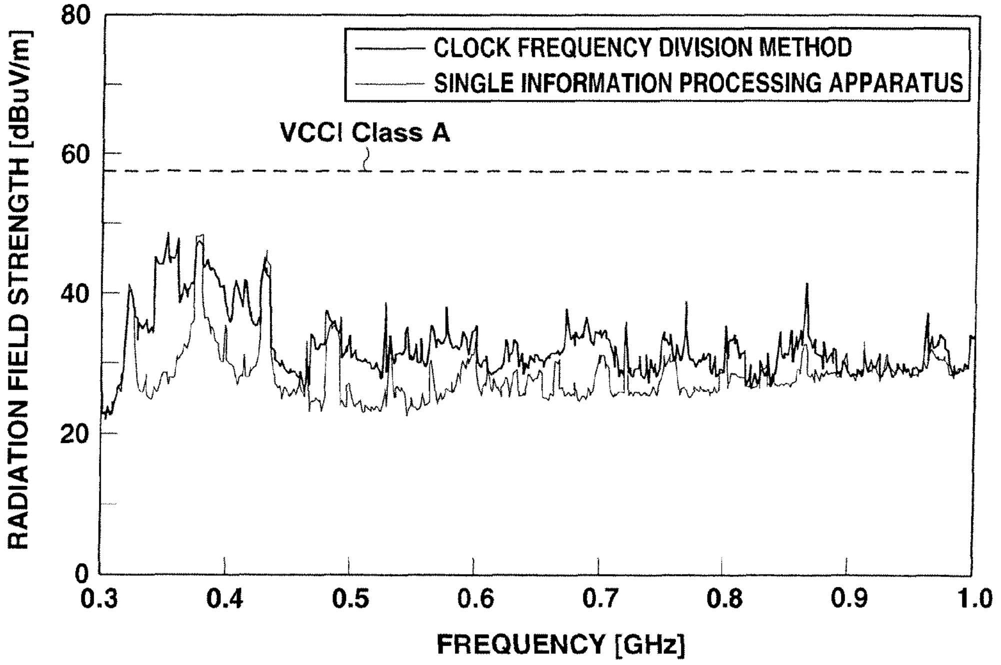
FIG. 11 is a graph showing the frequency spectrum of an unwanted electromagnetic wave in the use of the information leakage prevention apparatus according to the third embodiment.

FIG. 11 shows the frequency spectrum of an unwanted electromagnetic wave in the use of the information leakage prevention apparatus according to the third embodiment. In this case, the level difference increases between a frequency spectrum when the information processing apparatus operates alone and that when a leakage prevention signal having the dot clock frequency $f_s$ is used. Therefore, a satisfactory leakage prevention effect can be obtained even when the dot clock frequency $f_0$ contained in the image signal used in the internal screen display device differs from the frequency $f_s$ of the basic clock signal used to generate the leakage prevention signal.

Similar to the first embodiment, the radiation field strength at the carrier frequency of an unwanted electromagnetic wave can be easily reduced to the regulatory level of VCCI or the like.

In the embodiment, the frequency division ratios of the frequency division units 16 and 17 may be set from the outside of an information leakage prevention apparatus 10, similar to the above-described frequency information of the basic clock signal BC. More specifically, a plurality of firmware programs having different frequency division ratios for the frequency division units 16 and 17 are set in advance in the information leakage prevention apparatus 10, and a firmware program having a desired frequency division ratio is selected by an operation from the outside of the information leakage prevention apparatus 10. Alternatively, a firmware program having an arbitrary frequency division ratio is registered in the information leakage prevention apparatus 10 from the outside via the data input/output interface of the information leakage prevention apparatus 10.

The frequency division ratios of the frequency division units 16 and 17 can be easily changed to easily generate the leakage prevention signal JC corresponding to the radiation characteristic of an unwanted electromagnetic wave. One information leakage prevention apparatus 10 can widely cope with unwanted electromagnetic waves of different radiation characteristics.

Fourth Embodiment

Figure 12:
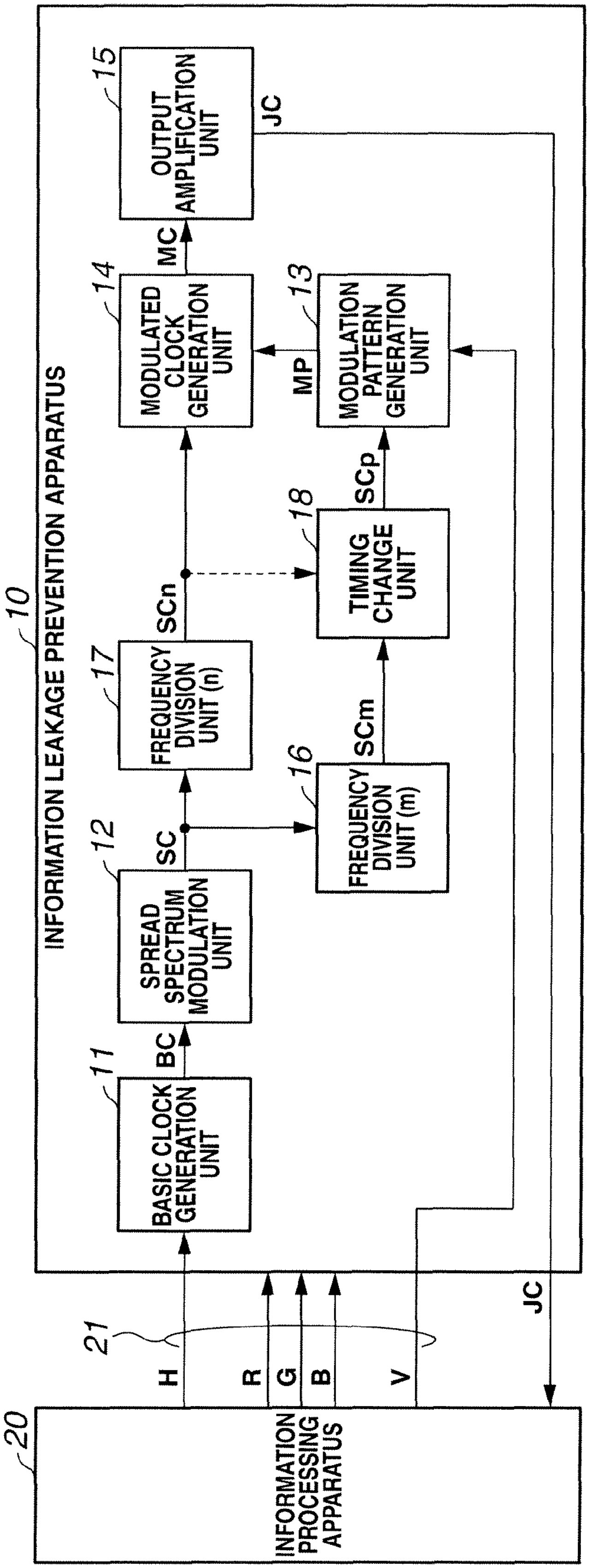
FIG. 12 is a block diagram showing the arrangement of an information leakage prevention apparatus according to the fourth embodiment.

An information leakage prevention apparatus according to the fourth embodiment of the present invention will be explained with reference to FIG. 12. FIG. 12 is a block diagram showing the arrangement of the information leakage prevention apparatus according to the fourth embodiment.

The fourth embodiment is different from the third embodiment in that a timing change unit 18 is interposed between a frequency division unit 16 and a modulation pattern generation unit 13. The remaining arrangement is the same as that in the third embodiment, and a detailed description thereof will not be repeated.

The timing change unit 18 has a function of performing signal processing for the spread spectrum clock signal SCm input from the frequency division unit 16 to generate a timing change signal SCp for changing the pulse timing of the spread spectrum clock signal SCm, and output it to the modulation pattern generation unit 13. The modulation pattern generation unit 13 generates a PN code at a timing based on the timing change signal SCp.

Since the timing to generate the PN code temporally changes, randomness can be enhanced and the leakage prevention signal JC can be spread to a wider band.

Figure 13A:
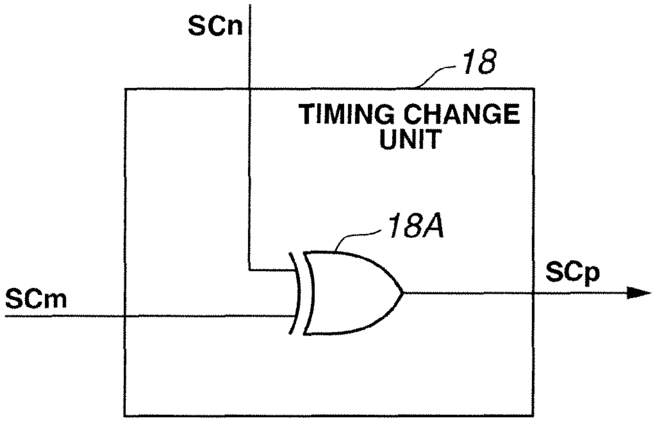
FIG. 13A is a diagram showing an arrangement example of a timing change unit.
Figure 13B:
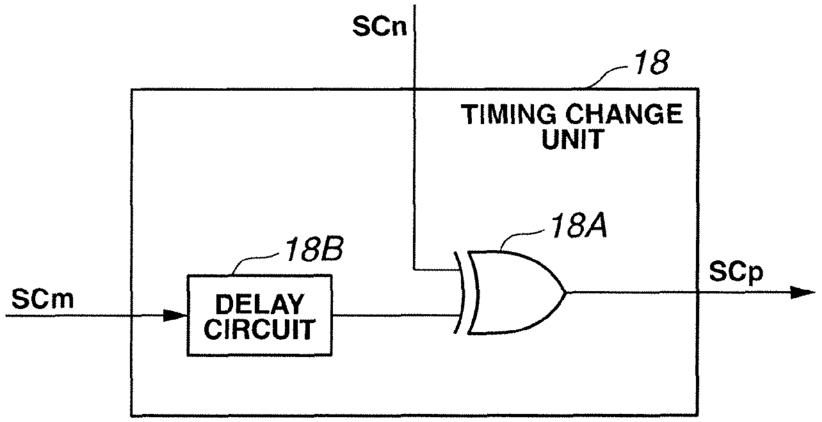
FIG. 13B is a diagram showing another arrangement example of the timing change unit.
Figure 13C:
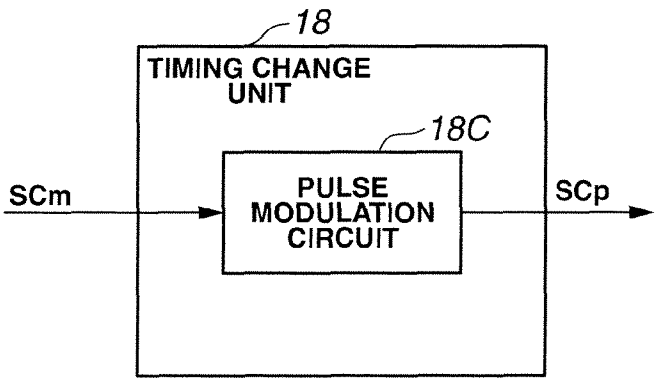
FIG. 13C is a diagram showing still another arrangement example of the timing change unit.
Figure 14A:
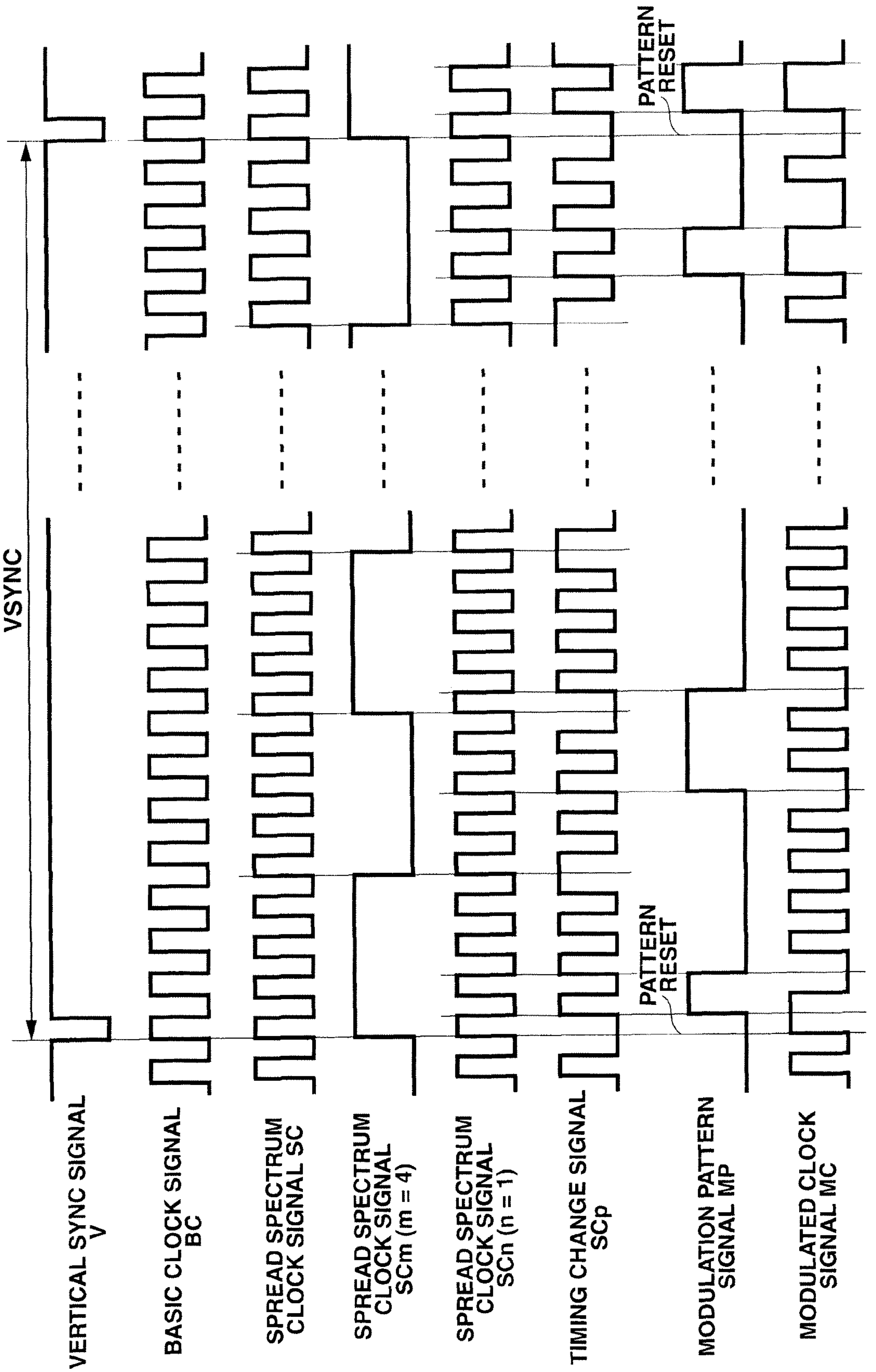
FIG. 14A is a timing chart showing the operation of the information leakage prevention apparatus (FIG. 13A) according to the fourth embodiment.
Figure 14B:
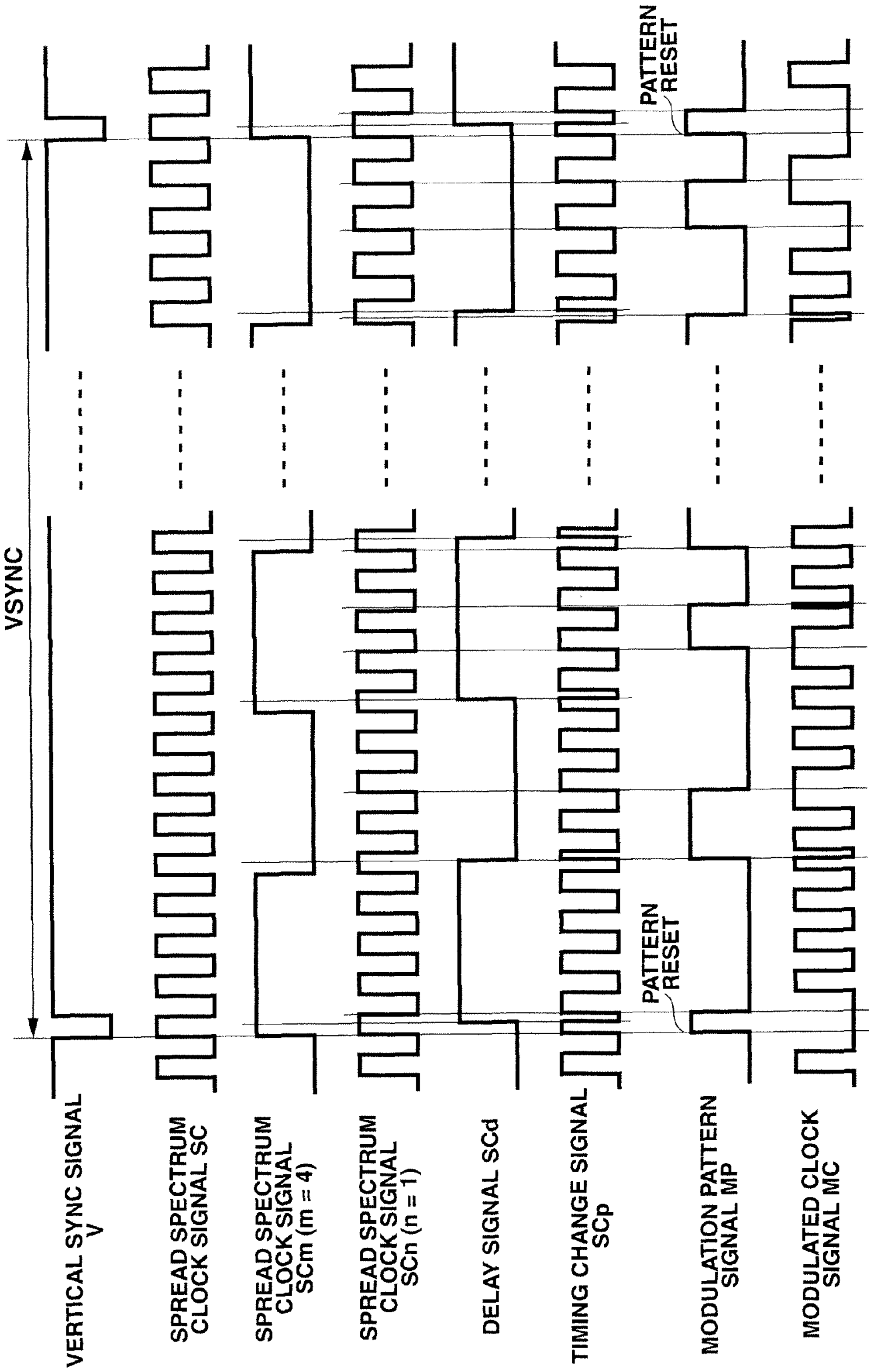
FIG. 14B is a timing chart showing the operation of the information leakage prevention apparatus (FIG. 13B) according to the fourth embodiment.
Figure 14C:
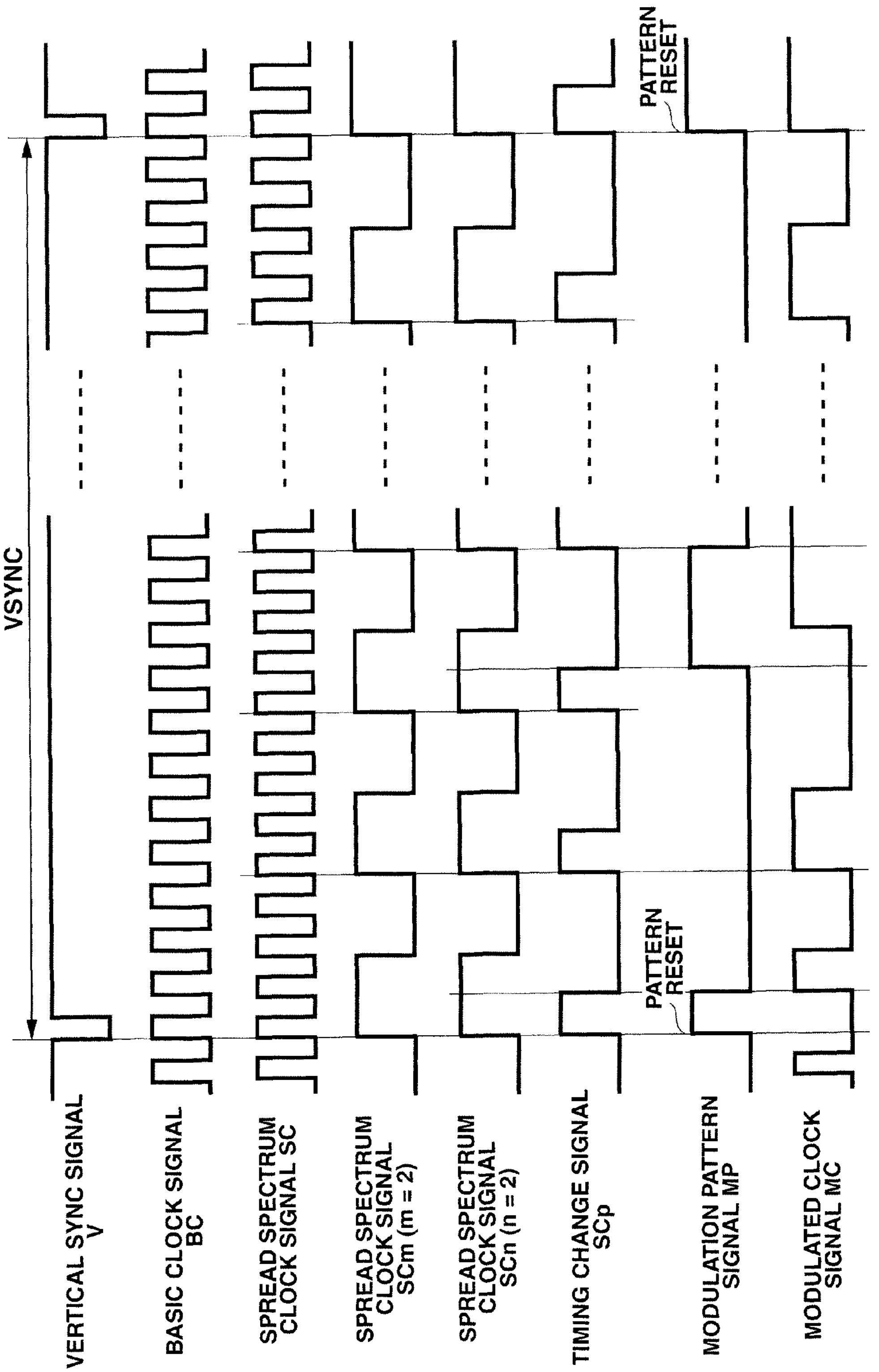
FIG. 14C is a timing chart showing the operation of the information leakage prevention apparatus (FIG. 13C) according to the fourth embodiment.

Several detailed arrangement examples of the timing change unit 18 are conceivable. FIGS. 13A to 13C show detailed arrangement examples of the timing change unit 18. FIGS. 14A to 14C are timing charts showing operations of the information leakage prevention apparatus according to the fourth embodiment when these detailed arrangements are applied.

In the example of FIG. 13A, the timing change unit 18 includes a gate 18A which generates the timing change signal SCp by modulating the input spread spectrum clock signal SCm by the spread spectrum clock signal SCn from a frequency division unit 17 by exclusive OR. In the timing chart of FIG. 14A, the frequency division ratio of the frequency division unit 16 is m=4, and that of the frequency division unit 17 is n=1. In this example, the modulation pattern generation unit 13 generates a PN code at the leading edge of the timing change signal SCp.

With a simple circuit arrangement, the pulse timing of the spread spectrum clock signal SCm can be changed.

In the example of FIG. 13B, the timing change unit 18 includes a delay unit 18B which generates a delay signal SCd obtained by delaying the input spread spectrum clock signal SCm, and the gate 18A which generates the timing change signal SCp by modulating the delay signal SCd based on the spread spectrum clock signal SCn from the frequency division unit 17 by exclusive OR. In the timing chart of FIG. 14B, the frequency division ratio of the frequency division unit 16 is m=4, and that of the frequency division unit 17 is n=1. In this example, the modulation pattern generation unit 13 generates a PN code at the leading edge of the timing change signal SCp.

Compared to the timing change unit in FIG. 13A, the pulse timing of the spread spectrum clock signal SCm can be changed more complicatedly.

In the example of FIG. 13C, the timing change unit 18 includes a pulse modulation unit 18C which generates the timing change signal SCp by modulating the pulse of the input spread spectrum clock signal SCm. The pulse modulation method in the pulse modulation unit 18C can be a general pulse modulation method of, for example, outputting a pulse of a predetermined width at the leading edge of the pulse of the spread spectrum clock signal SCm. In the timing chart of FIG. 14C, the frequency division ratio of the frequency division unit 16 is m=2, and that of the frequency division unit 17 is n=2. In this example, the modulation pattern generation unit 13 generates a PN code at the leading and trailing edges of the timing change signal SCp.

The pulse timing of the spread spectrum clock signal SCm can be changed without using the spread spectrum clock signal SCn from the frequency division unit 17.

In the embodiment, the pulse timing of the spread spectrum clock signal SCm used to generate the timing change signal SCp by the timing change unit 18 may be set from the outside of an information leakage prevention apparatus 10. More specifically, a plurality of firmware programs having different pulse timings for the spread spectrum clock signal SCm are set in advance in the information leakage prevention apparatus 10, and a desired pulse timing is selected by an operation from the outside of the information leakage prevention apparatus 10. Alternatively, an arbitrary pulse timing is registered in the information leakage prevention apparatus 10 from the outside via the data input/output interface of the information leakage prevention apparatus 10.

The pulse timing of the spread spectrum clock signal SCm can be easily changed to easily generate the leakage prevention signal JC corresponding to the radiation characteristic of an unwanted electromagnetic wave. One information leakage prevention apparatus 10 can widely cope with unwanted electromagnetic waves of different radiation characteristics.

Fifth Embodiment

Figure 15:
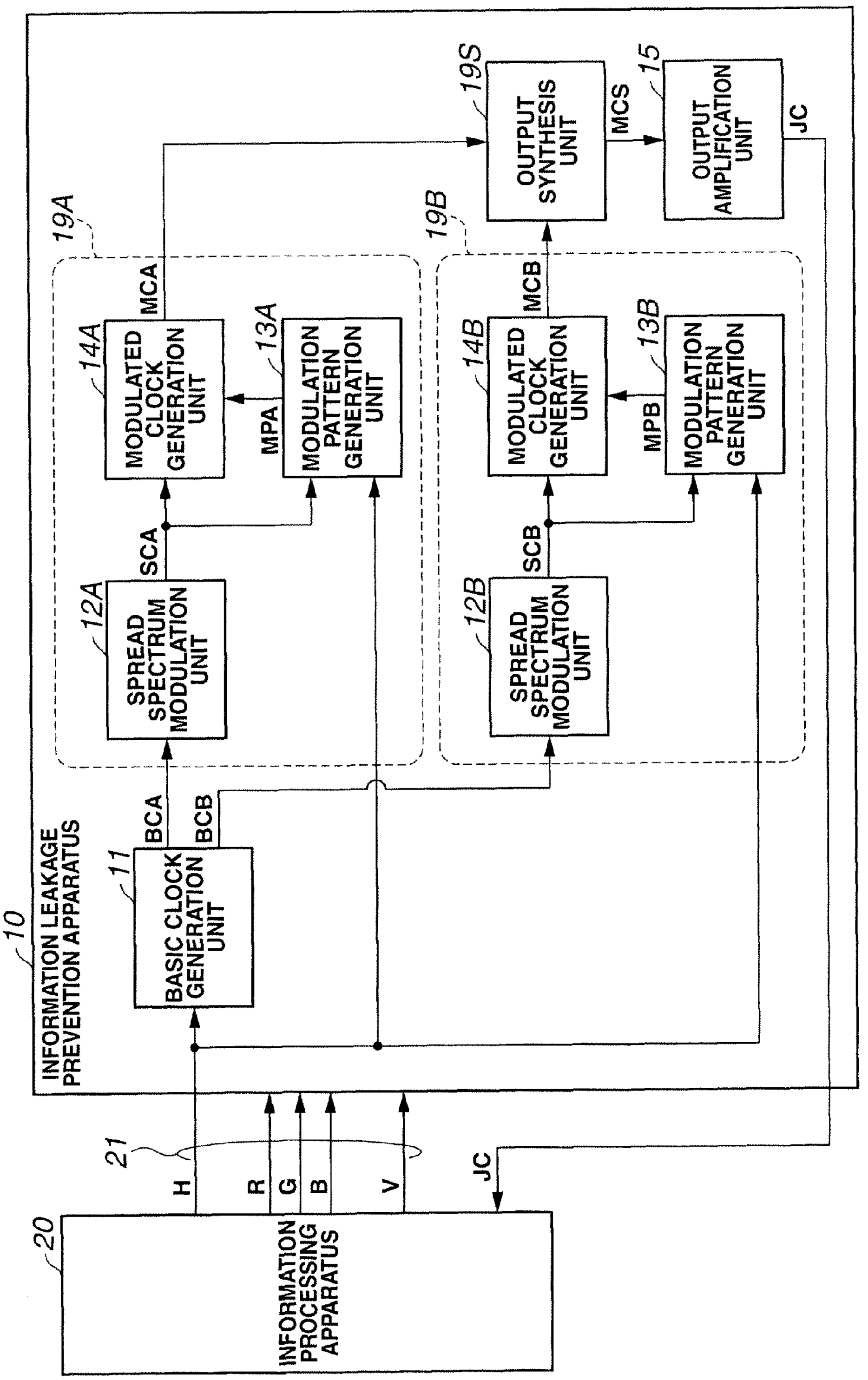
FIG. 15 is a block diagram showing the arrangement of an information leakage prevention apparatus according to the fifth embodiment.

An information leakage prevention apparatus according to the fifth embodiment of the present invention will be explained with reference to FIG. 15. FIG. 15 is a block diagram showing the arrangement of the information leakage prevention apparatus according to the fifth embodiment.

The fifth embodiment is different from the first embodiment in that a basic clock generation unit 11 generates, as the basic clock signal BC, a plurality of individual basic clock signals BCA and BCB of frequencies having neither an integer multiple relationship nor an integer fraction relationship, modulation processing units 19A and 19B each including a set of a spread spectrum modulation unit 12, modulation pattern generation unit 13, and modulated clock generation unit 14 are juxtaposed for the respective individual basic clock signals BCA and BCB, and an output synthesis unit 19S synthesizes individual modulated clock signals MCA and MCB respectively obtained by the modulation processing units 19A and 19B.

The modulation processing units 19A and 19B are different in the input individual basic clock signals BCA and BCB, but have the same circuit arrangement and operation. More specifically, the modulation processing unit 19A includes a spread spectrum modulation unit 12A, modulation pattern generation unit 13A, and modulated clock generation unit 14A. The modulation processing unit 19B includes a spread spectrum modulation unit 12B, modulation pattern generation unit 13B, and modulated clock generation unit 14B.

The spread spectrum modulation unit 12A (12B) generates an individual spread spectrum clock signal SCA (SCB) by performing spread spectrum clocking processing for the input individual basic clock signal BCA (BCB).

The modulation pattern generation unit 13A (13B) outputs, as an individual modulation pattern signal MPA (MPB), a PN code having sign bit data synchronized with each pulse of the individual spread spectrum clock signal SCA (SCB). In addition, the modulation pattern generation unit 13A (13B) resets the repetition period of the PN code based on the horizontal sync signal H.

The modulated clock generation unit 14A (14B) generates the individual modulated clock signal MCA (MCB) by modulating the individual spread spectrum clock signal SCA (SCB) in accordance with the individual modulation pattern signal MPA (MPB).

The output synthesis unit 19S generates a synthesized modulated clock signal MCS by synthesizing the individual modulated clock signals MCA and MCB respectively generated by the modulated clock generation units 14A and 14B of the modulation processing units 19A and 19B.

An output amplification unit 15 generates the leakage prevention signal JC by amplifying the synthesized modulated clock signal MCS from the output synthesis unit 19S.

Figure 16:
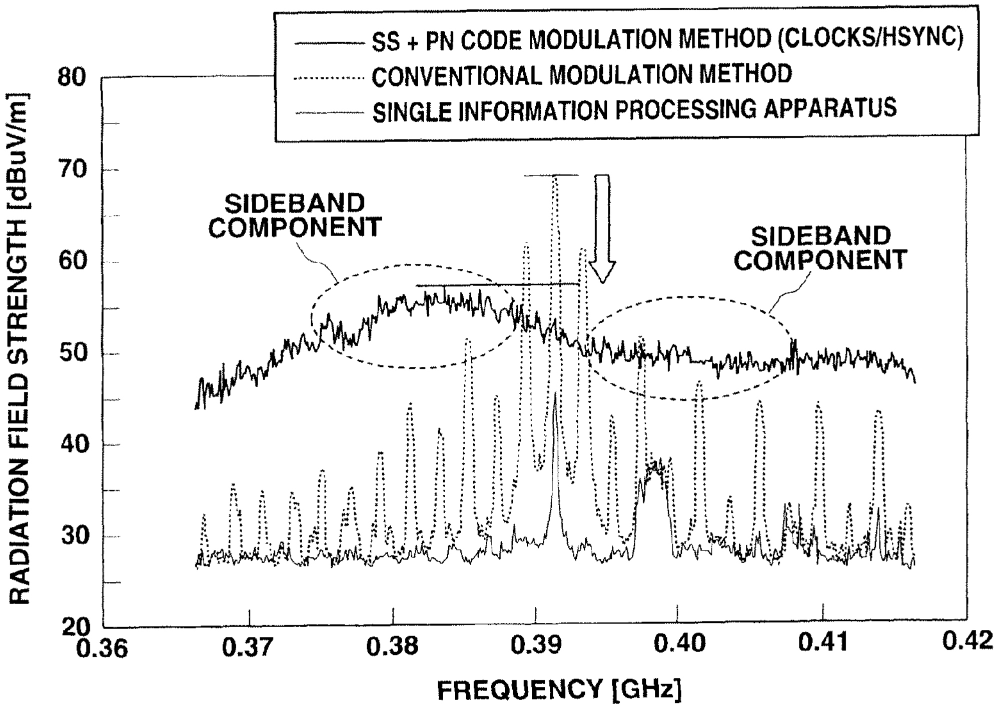
FIG. 16 is a graph showing the frequency spectrum of an unwanted electromagnetic wave in the use of the information leakage prevention apparatus (horizontal sync reset) according to the fifth embodiment.
Figure 17:
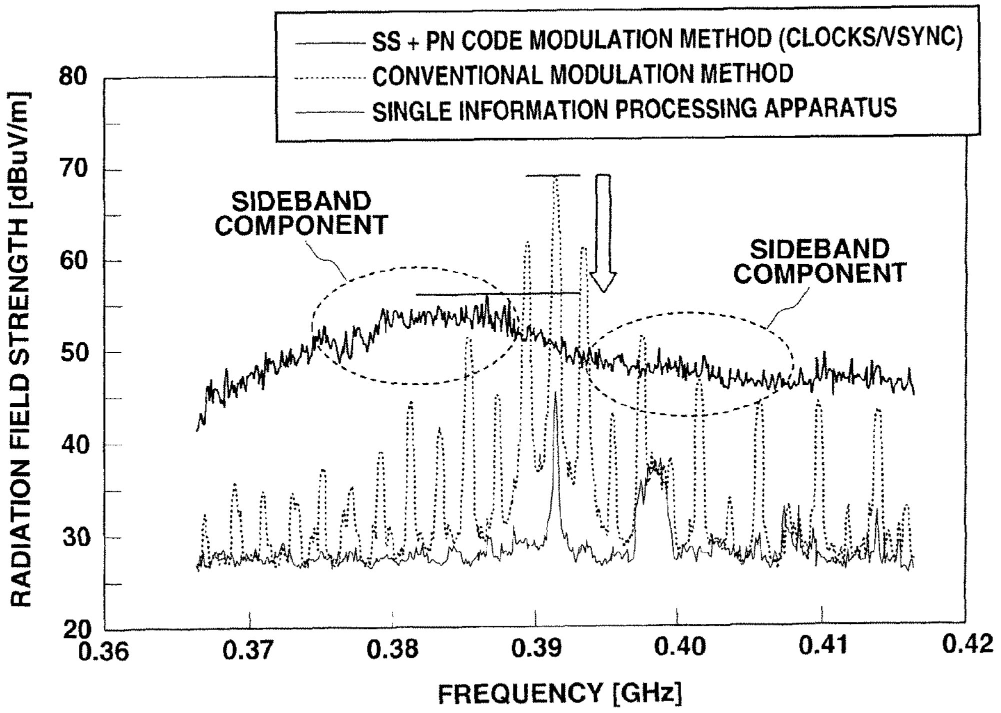
FIG. 17 is a graph showing the frequency spectrum of an unwanted electromagnetic wave in the use of the information leakage prevention apparatus (vertical sync reset) according to the fifth embodiment.

FIGS. 16 and 17 show the frequency spectrum of an unwanted electromagnetic wave in the use of the information leakage prevention apparatus according to the fifth embodiment. FIG. 16 shows an example in which the repetition period of the PN code is reset based on the horizontal sync signal H. FIG. 17 shows an example in which the repetition period of the PN code is reset based on the vertical sync signal V. Similar to the above-described example, FIGS. 16 and 17 show a frequency spectrum using a carrier of a 0.39-GHz ($f_0\times6$) harmonic component which is six times (N=6) higher than the dot clock frequency component $f_0$=65 MHz (XGA) in an example using a leakage prevention signal obtained using the two, individual basic clock signal BCA (60 MHz) and individual basic clock signal BCB (66 MHz).

Both FIGS. 16 and 17 reveal that the sideband component level of an unwanted electromagnetic wave greatly rises in the entire sideband of the carrier frequency of the unwanted electromagnetic wave, compared to the case in which the information processing apparatus operates alone and the case in which the conventional fixed pattern modulation method is used. This means that the leakage prevention signal obtained according to the embodiment contains a sideband component of a satisfactory level. This can make it very difficult to reproduce original image information using the sideband component of the unwanted electromagnetic wave. Further, the spread effect of spread spectrum clocking processing reduces the radiation field strength at the carrier frequency of the unwanted electromagnetic wave.

[Effects of Fifth Embodiment]

In the fifth embodiment, a plurality of individual basic clock signals BCA and BCB of frequencies having neither an integer multiple relationship nor an integer fraction relationship undergo spread spectrum clocking processing and are modulated based on the PN code, generating the individual modulated clock signals MCA and MCB. The leakage prevention signal JC is generated from the synthesized modulated clock signal MCS obtained by synthesizing the individual modulated clock signals MCA and MCB. A leakage prevention signal containing a sideband component of a level equal to or higher than the level in the first embodiment can be generated. This can make it very difficult to reproduce original image information using the sideband component of the unwanted electromagnetic wave, obtaining a useful leakage prevention effect.

In the embodiment, the basic clock generation unit 11 generates a plurality of individual basic clock signals BCA and BCB of frequencies having neither an integer multiple relationship nor an integer fraction relationship. Spectral localization caused by overlapping of spectra of the leakage prevention signal JC can be avoided. Leakage from an unwanted electromagnetic wave can be satisfactorily prevented at all frequencies.

From experiment, the highest leakage prevention effect was obtained when the frequencies of the individual basic clock signals BCA and BCB had a frequency difference of about 10%. However, the optimum frequency difference changes depending on the condition such as the spread ratio in spread spectrum clocking.

The embodiment has explained an example in which the two, modulation processing units 19A and 19B are arranged. However, this also applies to a case in which three or more modulation processing units are arranged. The fifth embodiment has been explained by exemplifying the arrangement based on the first embodiment. However, the fifth embodiment is not limited to this and may be applied to the arrangements described in the second to fourth embodiments.

Sixth Embodiment

Figure 18:
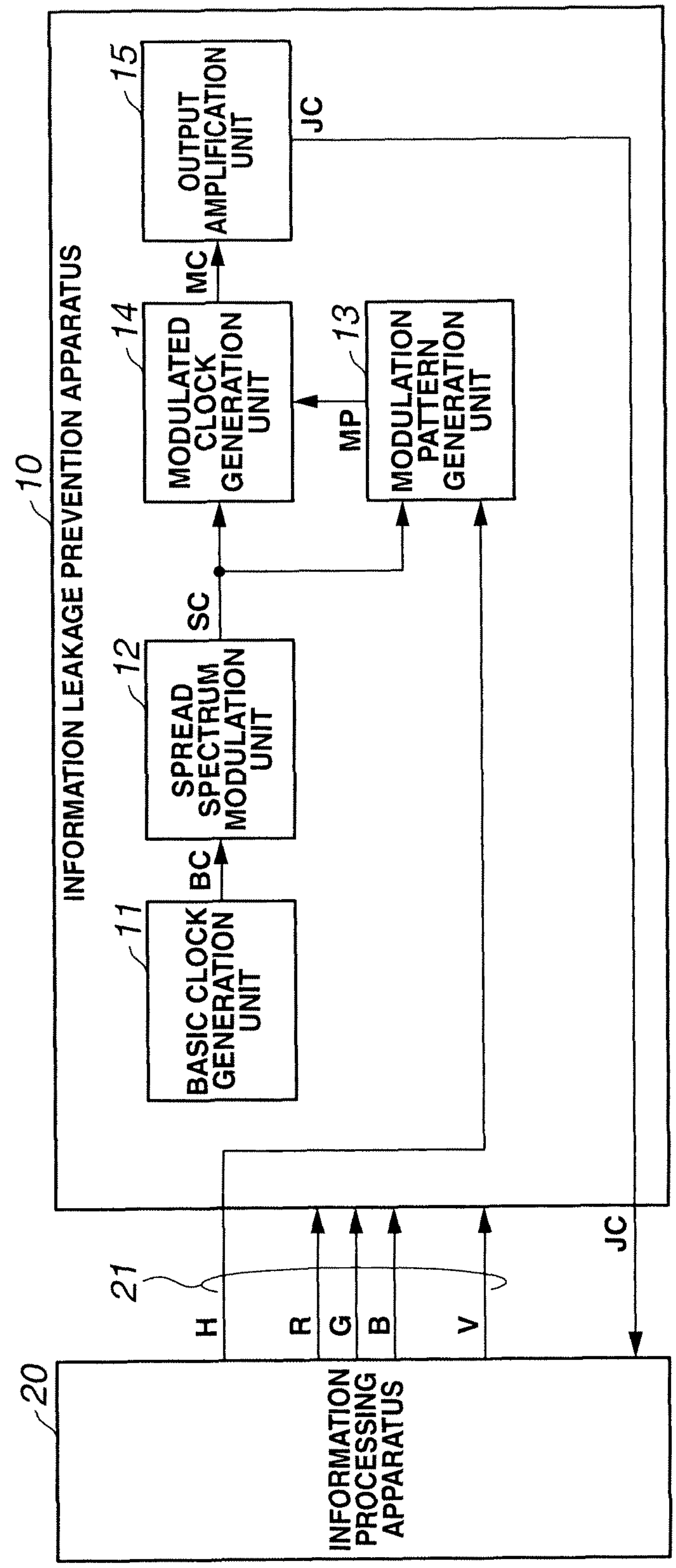
FIG. 18 is a block diagram showing the arrangement of an information leakage prevention apparatus according to the sixth embodiment.

An information leakage prevention apparatus according to the sixth embodiment of the present invention will be explained with reference to FIG. 18. FIG. 18 is a block diagram showing the arrangement of the information leakage prevention apparatus according to the sixth embodiment.

The sixth embodiment is different from the first embodiment in that a basic clock generation unit 11 generates the basic clock signal BC regardless of the carrier frequency and its harmonic frequency of image information leaked from an unwanted electromagnetic wave, and horizontal and vertical sync signals contained in an image signal.

More specifically, the basic clock generation unit 11 includes a clock signal oscillation circuit which autonomously generates a clock signal. The basic clock generation unit 11 outputs, as the basic clock signal BC, the clock signal generated by the clock signal oscillation circuit. Alternatively, the basic clock generation unit 11 may receive a clock signal generated by the clock signal oscillation circuit and output, as the basic clock signal BC, a signal generated using a general clock generation circuit such as a PLL circuit or multiplication circuit.

At this time, the basic clock signal BC may have a frequency different from the carrier frequency or its harmonic frequency of image information leaked from an unwanted electromagnetic wave, and may not synchronize with horizontal and vertical sync signals contained in an image signal.

Figure 19:
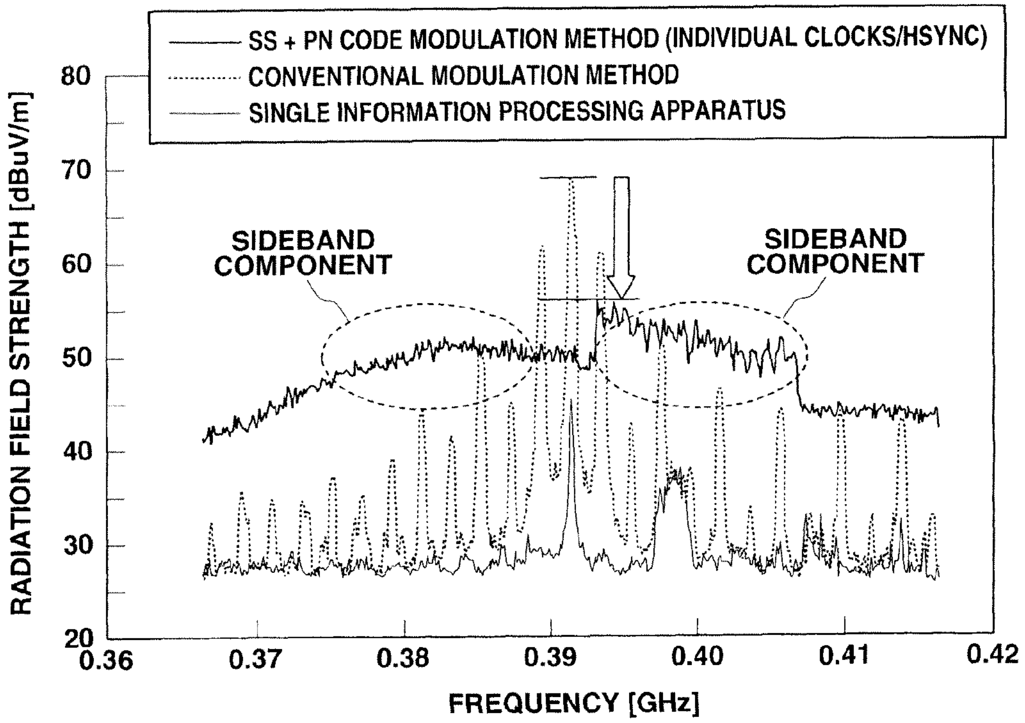
FIG. 19 is a graph showing the frequency spectrum of an unwanted electromagnetic wave in the use of the information leakage prevention apparatus (horizontal sync reset) according to the sixth embodiment.
Figure 20:
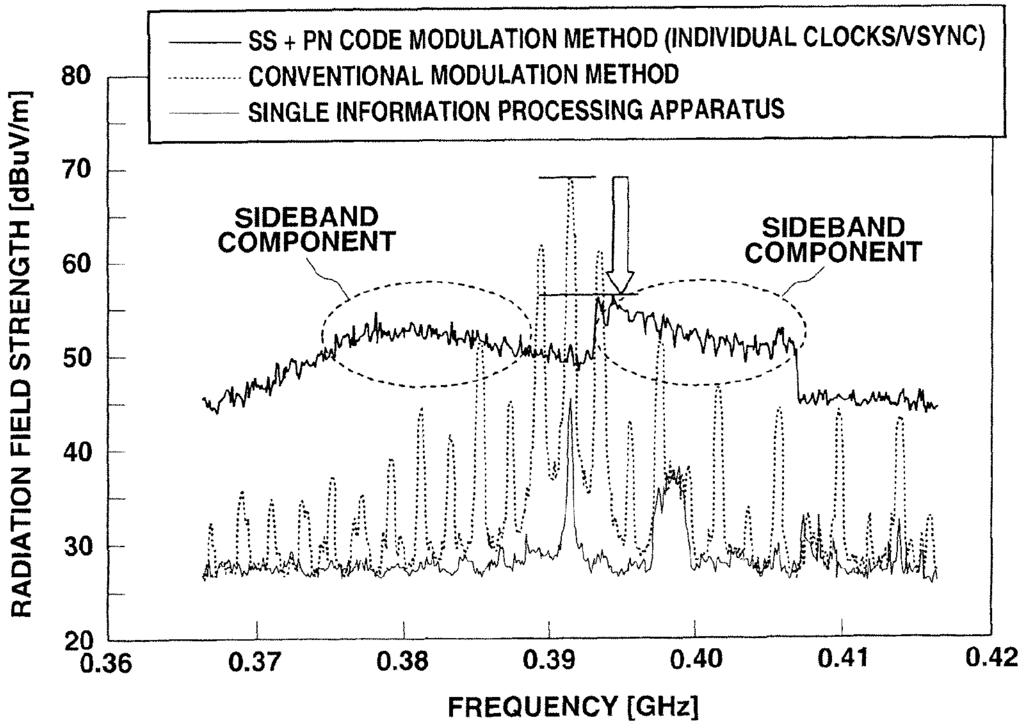
FIG. 20 is a graph showing the frequency spectrum of an unwanted electromagnetic wave in the use of the information leakage prevention apparatus (vertical sync reset) according to the sixth embodiment.

FIGS. 19 and 20 show the frequency spectrum of an unwanted electromagnetic wave in the use of the information leakage prevention apparatus according to the sixth embodiment. FIG. 19 shows an example in which the repetition period of the PN code is reset based on the horizontal sync signal H. FIG. 20 shows an example in which the repetition period of the PN code is reset based on the vertical sync signal V. Similar to the above-described example, FIGS. 19 and 20 show a frequency spectrum using a carrier of a 0.39-GHz ($f_0$×6) harmonic component which is six times (N=6) higher than the dot clock frequency component $f_0$=65 MHz (XGA) in an example using a leakage prevention signal obtained using the basic clock signal BC (80 MHz) which is autonomously generated regardless of horizontal and vertical sync signals contained in an image signal.

Both FIGS. 19 and 20 reveal that the sideband component level of an unwanted electromagnetic wave greatly rises in the entire sideband of the carrier frequency of the unwanted electromagnetic wave, compared to the case in which the information processing apparatus operates alone and the case in which the conventional fixed pattern modulation method is used. This means that the leakage prevention signal obtained according to the embodiment contains a sideband component of a satisfactory level. This can make it very difficult to reproduce original image information using the sideband component of the unwanted electromagnetic wave. Also, the spread effect of spread spectrum clocking processing reduces the radiation field strength at the carrier frequency of the unwanted electromagnetic wave.

[Effects of Sixth Embodiment]

As described above, the conventional technique generates a spectrum of discrete frequencies as the prevention signal. To the contrary, the present invention has a feature in which a high-density spectrum of continuous frequencies is generated using the PN code and spread spectrum clocking. By generating the leakage prevention signal JC of this spectrum, it becomes very difficult to reproduce original image information using the sideband component of the unwanted electromagnetic wave, obtaining a useful leakage prevention effect.

For this reason, the basic clock need not synchronize with the horizontal sync signal or vertical sync signal of an image signal. In addition, the basic clock need not have a clock frequency including the dot clock frequency or its harmonic frequency of an image signal externally output from the information processing apparatus. Further, the basic clock need not have a clock frequency which is a frequency set in advance in the information leakage prevention apparatus and includes the carrier frequency or its harmonic frequency of image information.

Even if the basic clock generation unit 11 autonomously generates an independent asynchronous basic clock of, e.g., several ten MHz regardless of the carrier frequency and its harmonic frequency of image information leaked from an unwanted electromagnetic wave, and horizontal and vertical sync signals contained in the image signal, the leakage prevention signal JC having a desired spectrum can be obtained, attaining a useful leakage prevention effect.

The embodiment can therefore implement a universal information leakage prevention apparatus without setting again the basic clock for each model of information processing apparatus or externally connected screen display device.

Note that the sixth embodiment has been explained by exemplifying the arrangement based on the first embodiment. However, the sixth embodiment is not limited to this and may be applied to the arrangements described in the second to fifth embodiments.

Seventh Embodiment

Figure 21:
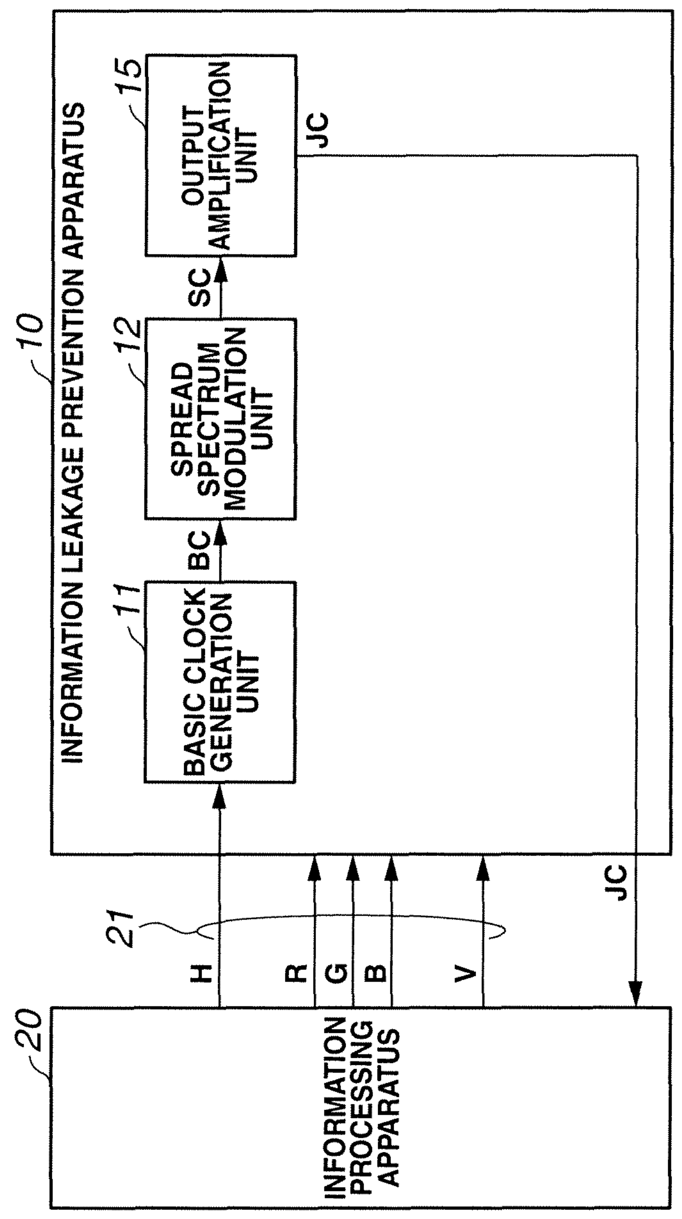
FIG. 21 is a block diagram showing the arrangement of an information leakage prevention apparatus according to the seventh embodiment.

An information leakage prevention apparatus according to the seventh embodiment of the present invention will be described with reference to FIG. 21. FIG. 21 is a block diagram showing the arrangement of the information leakage prevention apparatus according to the seventh embodiment.

The seventh embodiment is different from the first embodiment in that the modulation pattern generation unit 13 and modulated clock generation unit 14 are omitted, and the spread spectrum clock signal SC generated by a spread spectrum modulation unit 12 is directly input to and amplified by an output amplification unit 15, generating the leakage prevention signal JC.

[Effects of Seventh Embodiment]

Although modulation using the PN code is not applied to the basic clock signal BC, spread spectrum clocking processing is performed to spread the basic clock signal BC. While reducing the circuit scale and cost by the modulation pattern generation unit 13 and modulated clock generation unit 14, the leakage prevention signal JC containing a sideband component of a predetermined level can be obtained in the entire sideband of the carrier frequency of an unwanted electromagnetic wave. This can make it very difficult to reproduce original image information using the sideband component of the unwanted electromagnetic wave, obtaining a useful leakage prevention effect. The seventh embodiment may be applied to the arrangements described in the second, fifth, and sixth embodiments.

Eighth Embodiment

Figure 22:
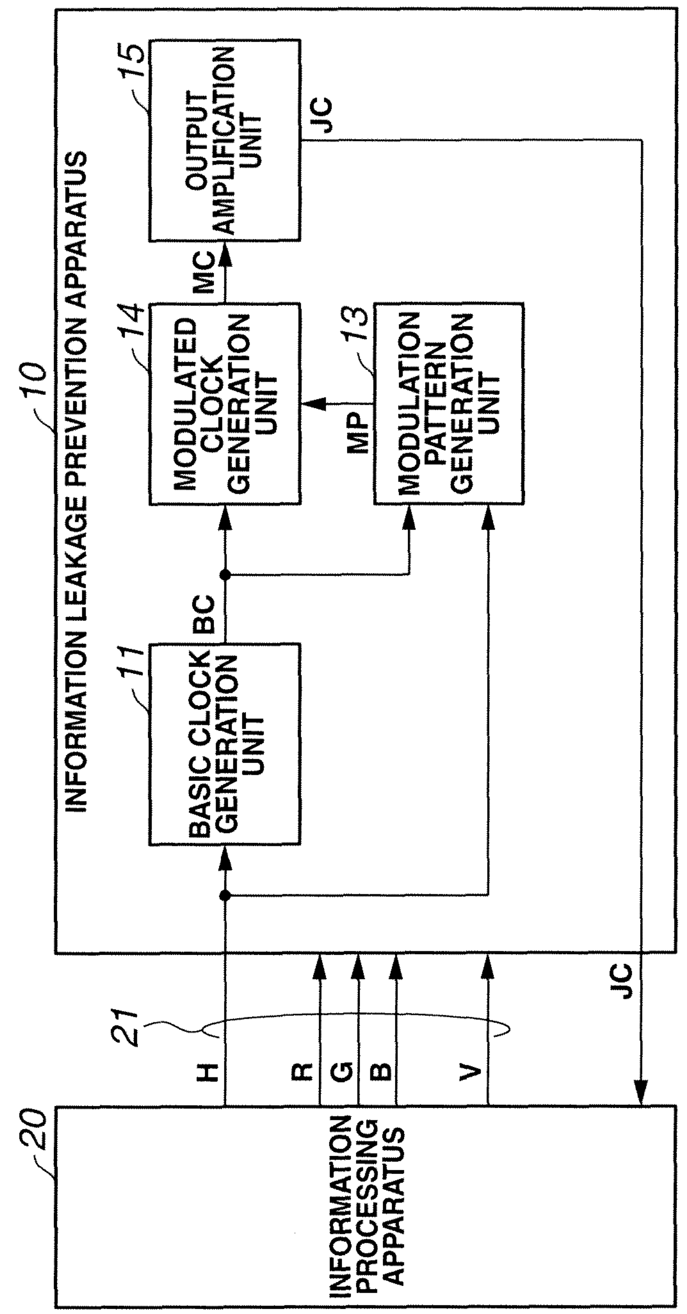
FIG. 22 is a block diagram showing the arrangement of an information leakage prevention apparatus according to the eighth embodiment.
Figure 23:
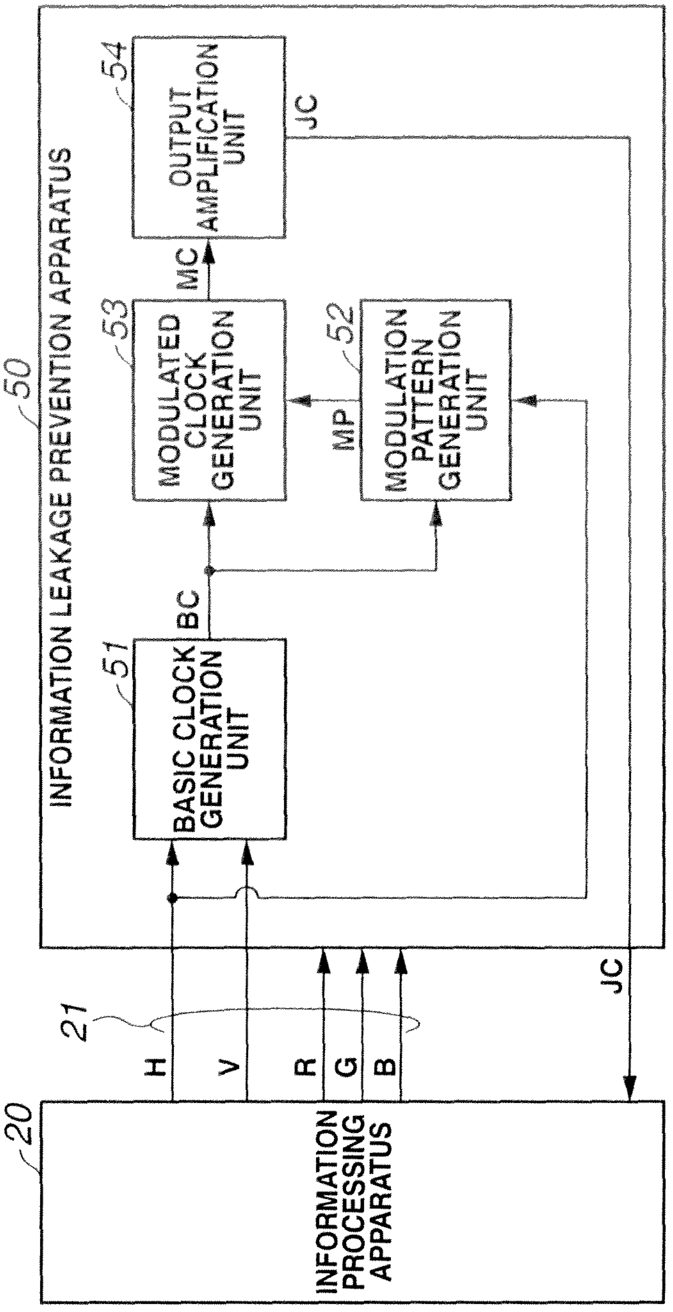
FIG.23 (PRIOR ART)
FIG. 23 is a block diagram showing the arrangement of a conventional information leakage prevention apparatus.
Figure 24:
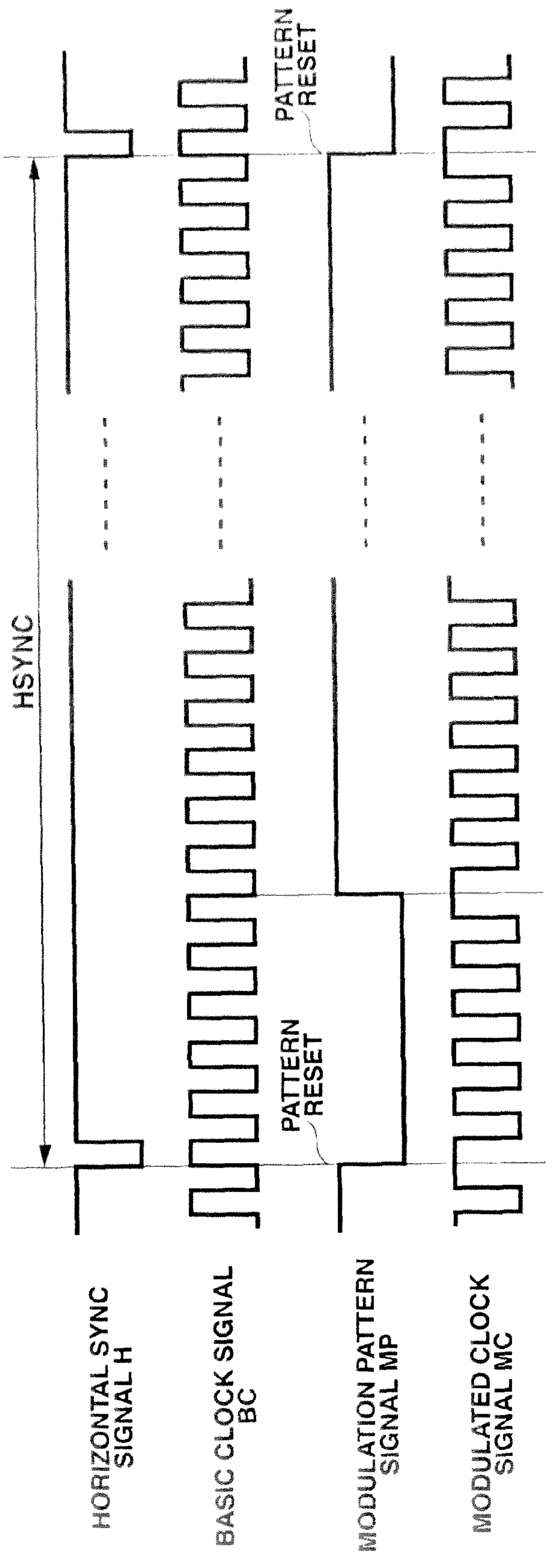
FIG.24 (PRIOR ART)
FIG. 24 is a timing chart showing a clock modulation operation in the conventional information leakage prevention apparatus.
Figure 25:
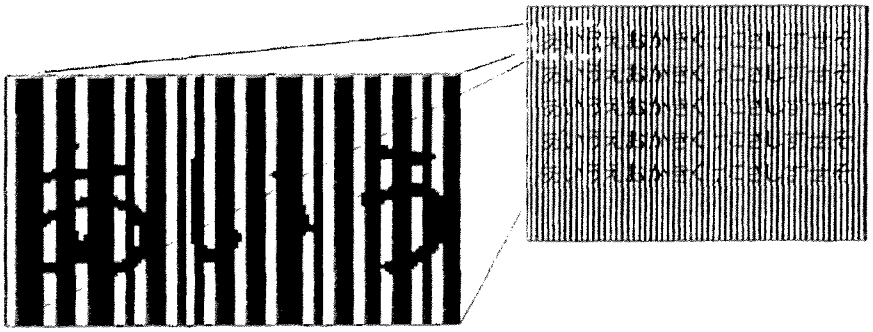
FIG.25 (PRIOR ART)
FIG. 25 is a view exemplifying an image reproduced from an unwanted electromagnetic wave.
Figure 26:
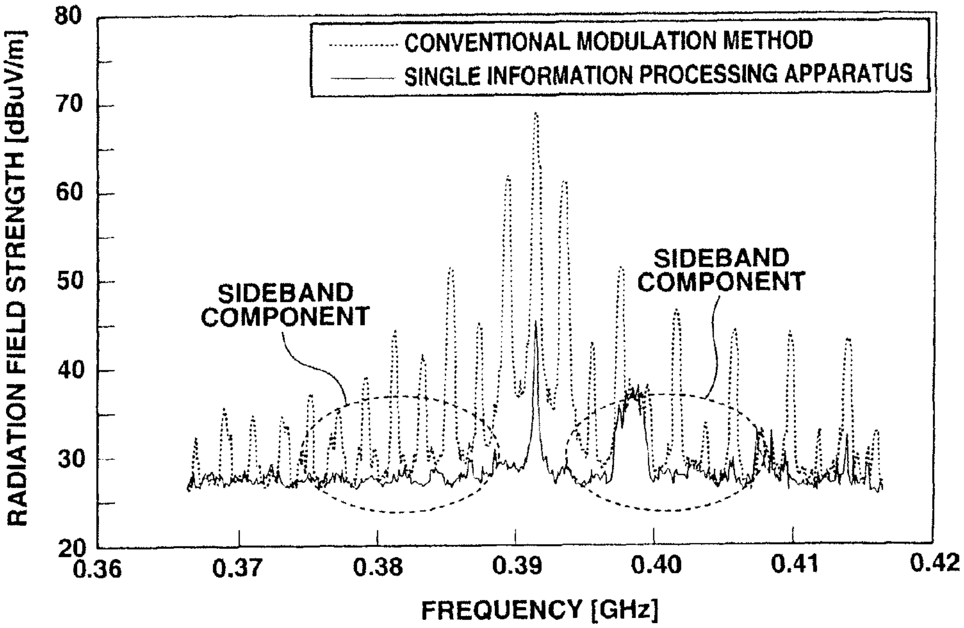
FIG.26 (PRIOR ART)
FIG. 26 is a graph showing the frequency spectrum of an unwanted electromagnetic wave in the use of the conventional information leakage prevention apparatus.

An information leakage prevention apparatus according to the eighth embodiment of the present invention will be described with reference to FIG. 22. FIG. 22 is a block diagram showing the arrangement of the information leakage prevention apparatus according to the eighth embodiment.

The eighth embodiment is different from the first embodiment in that the spread spectrum modulation unit 12 is omitted, and the basic clock signal BC generated by a basic clock generation unit 11 is directly input to a modulation pattern generation unit 13 and modulated clock generation unit 14.

The modulation pattern generation unit 13 generates a PN code having sign bit data synchronized with each pulse of the basic clock signal BC generated by the basic clock generation unit 11. At this time, the modulation pattern generation unit 13 resets the repetition period of the PN code based on the horizontal sync signal H of an image signal 21. As a result, the modulation pattern generation unit 13 generates the modulation pattern signal MP formed from the PN code having the period of the horizontal sync signal H as the repetition period.

The modulated clock generation unit 14 modulates the basic clock signal BC generated by the basic clock generation unit 11 in accordance with the modulation pattern signal MP input from the modulation pattern generation unit 13. Hence, the modulated clock generation unit 14 generates the modulated clock signal MC by modulating each pulse of the basic clock signal BC by each bit of the modulation pattern signal MP. An output amplification unit 15 amplifies the modulated clock signal MC, generating the leakage prevention signal JC.

[Effects of Eighth Embodiment]

Although no spread spectrum clocking processing is performed for the basic clock signal BC, modulation using the PN code is applied to spread the basic clock signal BC. While reducing the circuit scale and cost by the spread spectrum modulation unit 12, the leakage prevention signal JC containing a sideband component of a predetermined level can be obtained in the entire sideband of the carrier frequency of an unwanted electromagnetic wave. This can make it very difficult to reproduce original image information using the sideband component of the unwanted electromagnetic wave, obtaining a useful leakage prevention effect. The eighth embodiment may be applied to the arrangements described in the second to sixth embodiments.

[Extension of Embodiments]

The present invention has been described by referring to the embodiments, but is not limited to the above embodiments. It will readily occur to those skilled in the art that various changes and modifications can be made for the arrangement and details of the present invention within the scope of the invention.

EXPLANATION OF THE REFERENCE NUMERALS AND SIGNS

10 . . . information leakage prevention apparatus, 11 . . . basic clock generation unit, 12, 12A, 12B . . . spread spectrum modulation unit, 13, 13A, 13B . . . modulation pattern generation unit, 14, 14A, 14B . . . modulated clock generation unit, 15 . . . output amplification unit, 16 . . . frequency division unit (m frequency division), 17 . . . frequency division unit (n frequency division), 18 . . . timing change unit, 18A . . . gate, 18B . . . delay unit, 18C . . . , pulse modulation unit, 19A, 19B . . . modulation processing unit, 19S . . . output synthesis unit, 20 . . . information processing apparatus, 21 . . . image signal, H . . . horizontal sync signal, V . . . vertical sync signal, BC . . . basic clock signal, BCA, BCB . . . individual basic clock signal, SC . . . spread spectrum clock signal, SCA, SCB . . . individual spread spectrum clock signal, MP . . . modulation pattern signal, MPA, MPB . . . individual modulation pattern signal, MC . . . modulated clock signal, MCA, MCB . . . individual modulated clock signal, MCS . . . synthesized modulated clock signal, JC . . . leakage prevention signal, SCm . . . spread spectrum clock signal (m frequency division), SCn . . . spread spectrum clock signal (n frequency division), $f_0$, $f_s$ . . . dot clock frequency

The invention claimed is:

1. An information leakage prevention apparatus which generates, based on an image signal generated by an information processing apparatus, a leakage prevention signal for preventing leakage of image information from an unwanted electromagnetic wave containing a signal component of the image signal, comprising:

a basic clock generation unit that generates a basic clock signal that has a carrier frequency of the image information leaked from the unwanted electromagnetic wave or a harmonic frequency of the carrier frequency and synchronizes with a horizontal sync signal or vertical sync signal contained in the image signal;

a spread spectrum modulation unit that generates a spread spectrum clock signal by performing spread spectrum clocking processing for the basic clock signal;

a modulation pattern generation unit that outputs, as a modulation pattern signal, a PN (Pseudo Noise) code having sign bit data synchronized with each pulse of the spread spectrum clock signal, and resets a repetition period of the PN code based on the horizontal sync signal;

a modulated clock generation unit that generates a modulated clock signal by modulating the spread spectrum clock signal in accordance with the modulation pattern signal; and an output amplification unit that amplifies the modulated clock signal to generate the leakage prevention signal, wherein, said basic clock generation unit generates, as the basic clock signal, a plurality of individual basic clock signals of frequencies having neither an integer multiple relationship nor an integer fraction relationship, sets each including said spread spectrum modulation unit, said modulation pattern generation unit, and said modulated clock generation unit are juxtaposed for the respective individual basic clock signals, each of said modulation pattern generation units generates an individual spread spectrum clock signal by performing spread spectrum clocking processing for the individual basic clock signal, each of said modulation pattern generation units outputs, as an individual modulation pattern signal, a PN (Pseudo Noise) code having sign bit data synchronized with each pulse of the individual spread spectrum clock signal, and resets the repetition period of the PN code based on the horizontal sync signal, each of said modulated clock generation units generates an individual modulated clock signal by modulating the individual spread spectrum clock signal in accordance with the individual modulation pattern signal, the information leakage prevention apparatus further comprises an output synthesis unit that generates a synthesized modulated clock signal by synthesizing the individual modulated clock signals, and said output amplification unit amplifies the synthesized modulated clock signal to generate the leakage prevention signal.

2. An information leakage prevention apparatus according to claim 1, wherein said modulation pattern generation unit resets the repetition period of the PN code based on the vertical sync signal instead of the horizontal sync signal.

3. An information leakage prevention apparatus according to claim 1, further comprising:

a first frequency division unit that frequency-divides the spread spectrum clock signal by m (m is a positive integer) to input the frequency-divided spread spectrum clock signal to said modulation pattern generation unit; and a second frequency division unit that frequency-divides the spread spectrum clock signal by n (n is a positive integer) to input the frequency-divided spread spectrum clock signal to said modulated clock generation unit, wherein said modulation pattern generation unit generates the PN code having sign bit data synchronized with each pulse of the spread spectrum clock signal frequency-divided by m by said first frequency division unit, and said modulated clock generation unit generates the modulated clock signal by modulating, in accordance with the modulation pattern signal, the spread spectrum clock signal frequency-divided by n by said second frequency division unit.

4. An information leakage prevention apparatus according to claim 3, further comprising a timing change unit that generates a timing change signal for changing a pulse timing of the spread spectrum clock signal frequency-divided by m by said first frequency division unit, wherein said modulation pattern generation unit generates the PN code having sign bit data synchronized with each pulse of the timing change signal.

5. An information leakage prevention apparatus according to claim 1, wherein a clock frequency of the basic clock signal includes a dot clock frequency of an image signal externally output from the information processing apparatus to an externally connected screen display device or a harmonic frequency of the dot clock frequency.

6. An information leakage prevention apparatus according to claim 1, wherein a clock frequency of the basic clock signal is a frequency set in advance in the information leakage prevention apparatus, and includes the carrier frequency of the image information leaked from the unwanted electromagnetic wave or the harmonic frequency of the carrier frequency.

7. An information leakage prevention apparatus according to claim 1, wherein said basic clock generation unit generates the basic clock signal regardless of the carrier frequency of the image information leaked from the unwanted electromagnetic wave and the harmonic frequency of the carrier frequency, and the horizontal sync signal and vertical sync signal contained in the image signal.

8. An information leakage prevention method of generating, based on an image signal externally output from an information processing apparatus, a leakage prevention signal for preventing leakage of image information from an unwanted electromagnetic wave containing a signal component of the image signal, comprising:

the basic clock generation step of generating a basic clock signal that has a carrier frequency of the image information leaked from the unwanted electromagnetic wave or a harmonic frequency of the carrier frequency and synchronizes with a horizontal sync signal or vertical sync signal contained in the image signal;

the spread spectrum modulation step of generating a spread spectrum clock signal by performing spread spectrum clocking processing for the basic clock signal;

the modulation pattern generation step of outputting, as a modulation pattern signal, a PN (Pseudo Noise) code having sign bit data synchronized with each pulse of the spread spectrum clock signal, and resetting a repetition period of the PN code based on the horizontal sync signal;

the modulated clock generation step of generating a modulated clock signal by modulating the spread spectrum clock signal in accordance with the modulation pattern signal; and the output amplification step of amplifying the modulated clock signal to generate the leakage prevention signal, wherein, in the basic clock generation step, a plurality of individual basic clock signals of frequencies having neither an integer multiple relationship nor an integer fraction relationship are generated as the basic clock signal, sets each including the spread spectrum modulation step, the modulation pattern generation step, and the modulated clock generation step are juxtaposed for the respective individual basic clock signals, in each of the modulation pattern generation steps, an individual spread spectrum clock signal is generated by performing spread spectrum clocking processing for the individual basic clock signal, in each of the modulation pattern generation steps, a PN (Pseudo Noise) code having sign bit data synchronized with each pulse of the individual spread spectrum clock signal is output as an individual modulation pattern signal, and the repetition period of the PN code is reset based on the horizontal sync signal, in each of the modulated clock generation steps, an individual modulated clock signal is generated by modulating the individual spread spectrum clock signal in accordance with the individual modulation pattern sign, the information leakage prevention method further comprises the output synthesis step of generating a synthesized modulated clock signal by synthesizing the individual modulated clock signals, and in the output amplification step, the synthesized modulated clock signal is amplified to generate the leakage prevention signal.

9. An information leakage prevention method according to claim 8, wherein in the modulation pattern generation step, the repetition period of the PN code is reset based on the vertical sync signal instead of the horizontal sync signal.

10. An information leakage prevention method according to claim 8, further comprising:

the first frequency division step of frequency-dividing the spread spectrum clock signal by m (m is a positive integer); and the second frequency division step of frequency-dividing the spread spectrum clock signal by n (n is a positive integer), wherein in the modulation pattern generation step, the PN code having sign bit data synchronized with each pulse of the spread spectrum clock signal frequency-divided by m in the first frequency division step is generated, and in the modulated clock generation step, the modulated clock signal is generated by modulating, in accordance with the modulation pattern signal, the spread spectrum clock signal frequency-divided by n in the second frequency division step.

11. An information leakage prevention method according to claim 10, further comprising the timing change step of generating a timing change signal for changing a pulse timing of the spread spectrum clock signal frequency-divided by m in the first frequency division step, wherein in the modulation pattern generation step, the PN code having sign bit data synchronized with each pulse of the timing change signal is generated.

12. An information leakage prevention method according to claim 8, wherein a clock frequency of the basic clock signal includes a dot clock frequency of an image signal externally output from the information processing apparatus to an externally connected screen display device or a harmonic frequency of the dot clock frequency.

13. An information leakage prevention method according to claim 8, wherein a clock frequency of the basic clock signal is a frequency set in advance in the information leakage prevention apparatus, and includes the carrier frequency of the image information leaked from the unwanted electromagnetic wave or the harmonic frequency of the carrier frequency.

14. An information leakage prevention method according to claim 8, wherein in the basic clock generation step, the basic clock signal is generated regardless of the carrier frequency of the image information leaked from the unwanted electromagnetic wave and the harmonic frequency of the carrier frequency, and the horizontal sync signal and vertical sync signal contained in the image signal.

* * * * *